United States Patent
Shimizu et al.

(10) Patent No.: US 6,707,169 B2
(45) Date of Patent: Mar. 16, 2004

(54) ENGINE GENERATOR, CONTROLLER, STARTER APPARATUS, AND REMOTE CONTROL SYSTEM FOR THE ENGINE GENERATOR

(75) Inventors: Motohiro Shimizu, Saitama (JP); Masashi Nakamura, Saitama (JP); Kouichi Asai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 139 days.

(21) Appl. No.: 09/906,055

(22) Filed: Jul. 17, 2001

(65) Prior Publication Data

US 2002/0047419 A1 Apr. 25, 2002

(30) Foreign Application Priority Data

| | | | |
|---|---|---|---|
| Jul. 19, 2000 | (JP) | ........................ | 2000-218576 |
| Aug. 1, 2000 | (JP) | ........................ | 2000-233143 |
| Aug. 9, 2000 | (JP) | ........................ | 2000-241080 |
| Aug. 22, 2000 | (JP) | ........................ | 2000-250954 |

(51) Int. Cl.⁷ ............................ F02C 9/28; F02C 9/56; H02P 9/04
(52) U.S. Cl. ................. 290/40 C; 290/40 A; 290/40 B; 290/40 R; 290/41
(58) Field of Search ............................ 290/40 A, 40 B, 290/40 C, 40 R, 41, 7

(56) References Cited

U.S. PATENT DOCUMENTS

| | | | | |
|---|---|---|---|---|
| 3,943,373 A | * | 3/1976 | Yannone et al. | 290/40 R |
| 4,019,315 A | * | 4/1977 | Yannone et al. | 290/40 A |
| 4,021,677 A | * | 5/1977 | Rosen et al. | 180/65.2 |
| 4,208,591 A | * | 6/1980 | Yannone et al. | 290/40 R |
| 4,242,592 A | * | 12/1980 | Yannone et al. | 290/40 R |
| 4,283,634 A | * | 8/1981 | Yannone et al. | 290/40 R |
| 4,308,463 A | * | 12/1981 | Giras et al. | 290/40 R |
| 4,416,239 A | * | 11/1983 | Takase et al. | 123/406.47 |
| 4,543,829 A | * | 10/1985 | Lerch | 73/626 |
| 4,862,055 A | * | 8/1989 | Maruyama et al. | 322/8 |
| 5,095,221 A | * | 3/1992 | Tyler | 290/1 R |
| 5,180,923 A | * | 1/1993 | Tyler | 290/40 B |
| 5,252,860 A | * | 10/1993 | McCarty et al. | 290/40 R |
| 5,365,768 A | * | 11/1994 | Suzuki et al. | 702/104 |
| 5,379,769 A | * | 1/1995 | Ito et al. | 600/443 |
| 5,539,388 A | * | 7/1996 | Modgil | 340/3.2 |
| 5,685,802 A | * | 11/1997 | Kanno | 290/40 C |
| 5,731,688 A | * | 3/1998 | Thomson | 290/40 B |
| 5,840,033 A | * | 11/1998 | Takeuchi | 600/443 |
| 5,844,469 A | * | 12/1998 | Regazzi et al. | 180/287 |
| 5,929,586 A | * | 7/1999 | Noro et al. | 318/599 |
| 6,054,776 A | * | 4/2000 | Sumi | 290/17 |

* cited by examiner

*Primary Examiner*—Burton S. Mullins
*Assistant Examiner*—Pedro J. Cuevas
(74) *Attorney, Agent, or Firm*—Westerman, Hattori, Daniels & Adrian, LLP

(57) ABSTRACT

The present invention provides an engine generator which is small in the size but high in the efficiency of power generation and a controller for the engine generator. The present invention is implemented by a power generator G driven by an engine E, a starter motor M for cranking the engine E, and a controller 4 for supplying various electric loads including the starter motor M with a driving voltage which depends on the power released from the generator G and a battery 5.

18 Claims, 17 Drawing Sheets

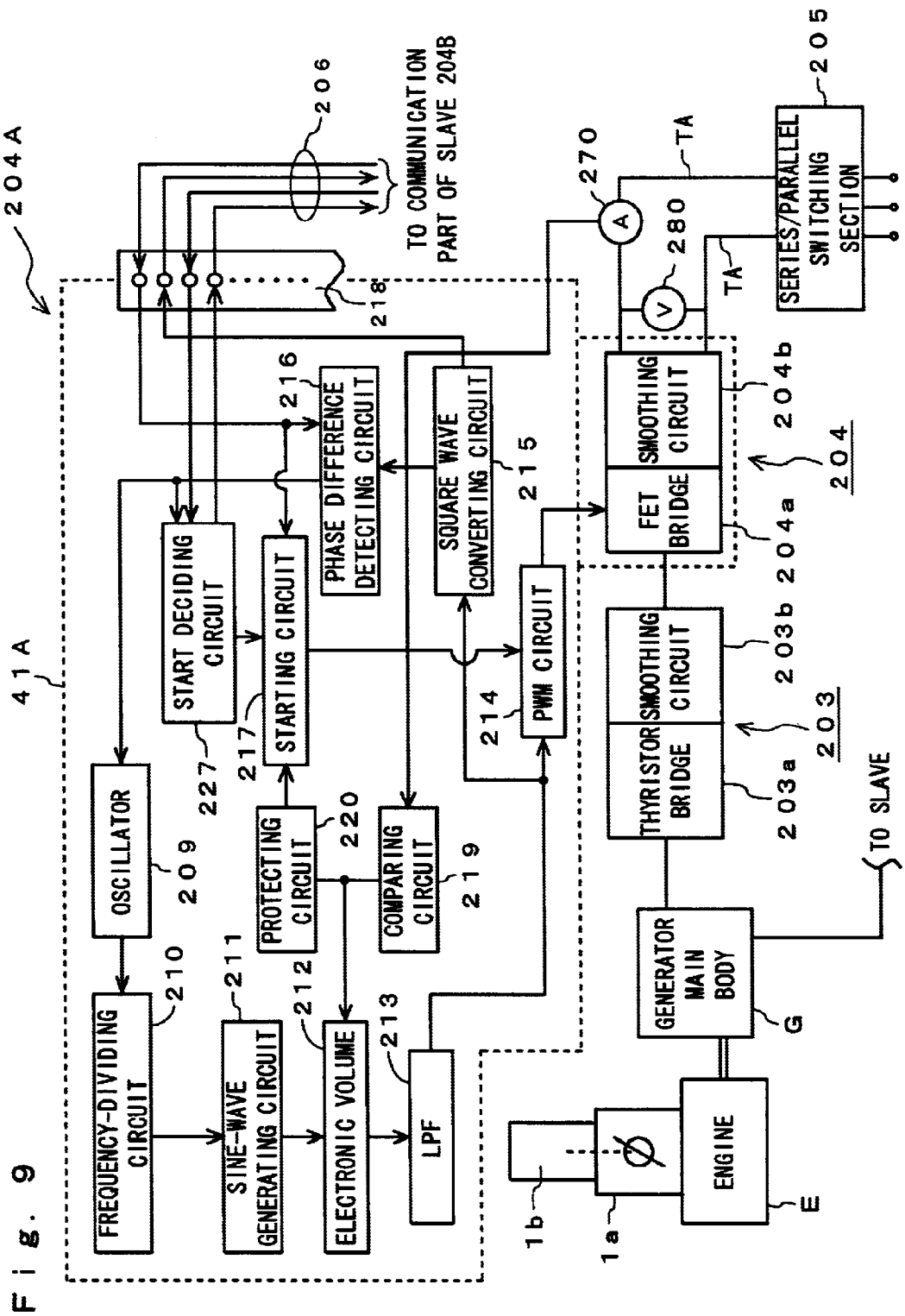

Fig. 20

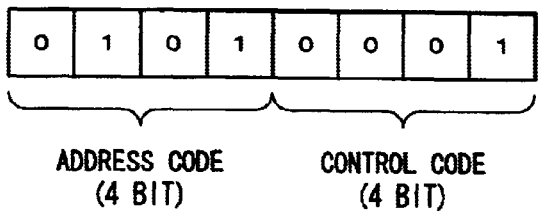

ADDRESS CODE (4 BIT)    CONTROL CODE (4 BIT)

Fig. 21

| TROUBLE | CRITERION | ACTION | GREEN LED | RED LED |
|---|---|---|---|---|
| SHORTAGE OF OIL | OIL LEVEL SW TURNED ON | ENGINE STALL | OFF | ON |
| ENGINE OVERHEAT | ENGINE TEMPERATURE OVER 250°C | | | ON AND OFF AT INTERVALS OF ONE SECOND |
| START DISABLED | NO COMPLETE COMBUSTION WHEN STARTER MOTOR TURNED ON | NOT START | | ON AND OFF AT INTERVALS OF 1/2 SECOND |
| ENGINE STALL | NO NUMBER OF REVOLUTIONS AFTER COMPLETE COMBUSTION | | | |
| AUTO-COCK TROUBLE | | ENGINE STALL | | ON AND OFF AT INTERVALS OF ONE SECOND AND 1/2 SECOND ALTERNATELY |
| FUEL CUT TROUBLE | OVERCURRENT | | | |
| BATTERY TROUBLE | Vbatt≥16V Vbatt≤7V (IN NO ACTION OF STARTER) | | | |

PRIOR ART

ENGINE GENERATOR, CONTROLLER, STARTER APPARATUS, AND REMOTE CONTROL SYSTEM FOR THE ENGINE GENERATOR

BACKGROUND OF THE INVENTION

1. Field of the Invention

The present invention relates to an engine generator for driving a generator with an engine, a controller for the engine generator, an inverter-type engine generator arranged for converting the main output of a generator to an alternating current voltage by an inverter circuit, an engine starter apparatus arranged for protecting a starter motor from being excessively loaded at the start-up of an engine, and a remote-control system for the engine generator arranged for receiving and transmitting remote-control signals over an output line of the engine generator.

2. Description of the Related Art (1) A modern engine generator is designed in which the on-timing for starting the supply of power from an igniter to the primary side of an ignition coil and the off-timing for canceling the supply of power from the igniter to generate a high voltage at the secondary side of the ignition coil are controlled by a microcomputer (a CPU).

More specifically, upon detecting the output signal of a pulser coil indicating that the engine rotating angle reaches a predetermined degree, the microcomputer calculates the on-timing and the off-timing on the basis of the engine speed and actuates the igniter from the on-timing to the off-timing to energize the primary side of the ignition coil.

In an engine generator having the engine started by a starter motor, the starter motor when energized for starting the engine draws a rush current and sharply increases the consumption of power instantly thus declining the battery voltage temporarily. When the microcomputer in the generating system is energized by a battery, its action may be unstable at the start-up of the engine or it may be reset.

For eliminating the above drawback, the conventional engine generator has an exciter winding provided on the generator in addition to the main windings for energizing the microcomputer.

The driving duration of the igniter depends on the source voltage. If the source voltage is low, the driving duration of the igniter or an interval between the on-timing and the off-timing is increased thus decreasing the operable period of the CPU. As a result, the CPU may fail to calculate the timing and the power generation will hardly be improved in the efficiency.

When the microcomputer is energized directly from the exciter winding, its source voltage will not be declined at the start-up of the engine. It is however necessary for feeding the microcomputer with an operable level of voltage at a minimum or cranking speed of the engine at the start-up to increase the size of the exciter winding. This may develop an excessively large level of voltage when the engine runs at a high speed.

(2) FIG. 22 is a block diagram showing a primary part of a conventional inverter type engine generator. A three-phase alternating current generator G is driven by an engine E. An AC output of the generator G is smoothed and converted to a DC form by a rectifying-smoothing circuit 61. A DC output of the rectifying-smoothing circuit 61 is then converted by an inverter circuit 62 to an AC output at a specific frequency.

The generator G has three-phase main windings C wound on a number (e.g. twenty one poles) of magnetic poles as some of full (e.g. twenty four) magnetic poles for generating a main output. Wound on the remaining (or three) of the magnetic poles are an inverter source coil 82, a battery charging coil 83, and an external DC source coil 84.

In the prior art shown in FIG. 22, each of the inverter source oil 82, the battery charging coil 83, and the other sub coil 84 holds one magnetic pole. Accordingly, when the total number of magnetic poles is 24 in the generator, only twenty one poles are assigned to the main output. Assuming that the main output is 4200 W, each of 21 magnetic poles undertakes 200 W. Consequently, each of the sub coils 82, 83, and 84 shares 200 W.

As the output of each of the sub coils 82, 83, and 84 is drawn only 10 to 15 W, 200 W is too large. On the other hand, the output of the main windings C may be too small for the size of the generator G.

(3) A conventional engine starter apparatus using a starter motor is provided for switching its ignition switch on to start an engine igniter. Then, when a starter switch is switched on, the start motor starts rotating. When the starter switch is turned off, the starter motor stops its action. More specifically, a driver presses the starter switch to actuate the starter motor and when the engine is started, releases the starter switch to stop the starter motor.

The starter motor consists mainly of a drive motor and a starter pinion gear. As the drive motor is rotated, the pinion gear is driven by its inertia to move into and engage with a ring gear mounted on the outer rim of a flywheel and the engine is cranked.

FIGS. 23 and 24 are timing charts showing the actions of relevant components at the start and stop of the engine in the prior art.

While the engine is being driven, the ignition switch is shifted at t1 from the on state to the off state. This cancels the action of the engine igniter thus gradually decreasing the engine speed. When the ignition switch is turned on just before the engine stops at t2, the action of the engine igniter is returned. If the engine is ignited again before the piston reaches the upper dead point for a compression process, it may rotate in a reverse direction thus exerting an excessive load to the starter motor. This phenomenon is known as "back kicking".

When the piston fails to complete the compression process before the engine stops and the engine rotates in a reverse direction, the switching on of the starter switch at t3 starts the starter motor and throws its pinion gear into the ring gear which rotates in the reverse direction. This is also known as "reverse re-throwing" and may exert an excessive load on the starter motor.

Also, once the starter motor is started, it continues to rotate even if the engine speed exceeds its complete combustion speed until it is switched off.

As shown in FIG. 24, when the engine fails to be started, the ignition switch remains turned on. Accordingly, when the piston fails to complete the compression process, the engine is ignited prior to the upper dead point thus developing an event of back kicking.

The prior art is only implemented by a rigid structure capable of bearing the excessive load generated in the back kicking or reverse re-throwing of the starter motor which is thus increased in the overall dimensions.

(4) The conventional engine generator having a power generator driven by an engine is connected from its body to a remote controller box by a remote control cable of substantially 10 meters. The remote controller box includes an engine switch for connecting the engine with a main source, a start switch for driving a starter motor to crank the engine, a pilot lamp for indicating that the engine generator is in action, and soon. The engine generator can thus be controlled from a remote location with the remote controller box.

The engine generator may of ten be sited close to an electric apparatuses to be energized. As the remote control cable connects between the engine generator and the remote controller box, it will interrupt the engine generator from being moved to a desired location.

Also, the engine generator has a receptacle provided on the main body thereof for directly accepting a plug from the electric apparatus to be energized and may allow its receptacle to be joined with the plug of an extension cable from the electric apparatus. As the electric apparatus is energized via the extension cable from the engine generator which is spaced significantly from the electric apparatus, the remote controller cable has to be extended for remote controlling the electric apparatus.

In the prior art, any error developed on the engine generator can hardly be notified by the remote controller box. In case that the operator of the remote controller box works out of sight of the engine generator, it may fail to recognize the error of the engine generator within a short time.

SUMMARY OF THE INVENTION

A first object of the present invention is provide an engine generator which is small in the size but high in the efficiency of power generation and a controller for the engine generator. A second object of the present invention is to provide an engine generator which is high in the efficiency of power generation. A third object of the present invention is to provide an engine starter apparatus which can start an engine with generating no event of back kicking or reverse re-throwing. A fourth object of the present invention is to provide a remote control system for an engine generator which is improved in the maneuverability and the mobility.

The first object of the present invention is implemented by the following features (1), (2).

(1) An engine generator of the present invention comprising a power generator driven by an engine, a starter motor for cranking the engine, and a controller for controlling various electric loads including the start motor with a driving voltage which depends on the power supplied from the generator and a battery. The controller including a voltage drop limiting means for minimizing a decrease in the driving voltage in the action of the starter motor.

(2) A controller for an engine generator of the present invention supplies various electric loads including a starter motor with a driving voltage which depends on the power received from a generator and a battery. The controller comprising a voltage drop limiting means for minimizing a decrease in the driving voltage in the action of the starter motor.

According to the feature (1), (2), the driving voltage supplied from the igniter of the controller to the primary side of the ignition coil is not declined when the power consumption of the battery increases at the startup of the starter motor. This allows the on period of the igniter to be shortened during the cranking action of the starter motor, hence ensuring the duration for the CPU calculating the timing of ignition. Accordingly, as the timing of ignition is calculated at higher accuracy, the engine generator can be improved in the efficiency of power generation and its controller can be implemented.

The second object of the present invention is implemented by the following features (3), (4).

(3) An engine generator of the present invention having an alternating current generator driven by an engine, a rectifier circuit for rectifying a main output released from the output terminal of the alternating current generator, an inverter circuit for converting an output of the rectifier circuit into an alternating voltage, and a transformer connected at its primary side to the output terminal of the alternating current generator. A part of the main output of the alternating current generator can be drawn out from the secondary side of the transformer and used as an internal power supply.

(4) An engine generator of the present invention is constituted that the secondary side of the transformer incorporates two or more sub-coils. Each sub-coil arranged for energizing a corresponding electric load.

According to the feature (3), as the ratio between the primary coil and the secondary coil of the transformer is determined to meet the requirement of power as the internal power supply, the output of the AC generator can be used at higher efficiency and released at higher effectiveness.

According to the feature (4), the windings of each sub-coil can be determined to meet the power consumption of its corresponding electric load which is energized by an internal power supply. This allows a desired power of the internal power supply to be accurately drawn out from the main output of the alternating current generator, thus improving the efficiency of power generation.

The third object of the present invention is implemented by the following features (5), (6).

(5) An engine starter apparatus of the present invention comprising a starter motor to crank an engine, a start switch for starting the engine, an igniting means for combusting the engine at specific timing, and a controller for controlling the action of the starter motor and the igniting means on the basis of the engine speed. The controller arranged for canceling the action of the starter motor when the engine speed in the cranking action exceeds a first reference and then inhibiting the action of the igniting means when the engine speed becomes lower than a second reference speed.

(6) An engine starter apparatus of the present invention comprising a starter motor to crank an engine, a start switch for starting the engine, an igniting means for combusting the engine at specific timing, and a controller for controlling the action of the starter motor and the igniting means on the basis of the engine speed. The controller including an engine stop examining means for examining from the engine speed whether the engine is in action or not, wherein the starter motor and the igniting means are switched on when the start switch is turned on and the engine stop examining means judges that the engine is not in action.

According to the feature (5), the action of the starter motor is automatically canceled when the engine speed exceeds the first engine speed. As the first engine speed is set equal to the complete combustion speed, the action of the starter motor will never continue once the engine is in action. The action of the igniting means is inhibited when the engine speed drops down to below the second engine speed, hence inhibiting any back kicking just before the action of the engine stops.

According to the feature (6), the action of the starter motor and the igniting means is inhibited when the engine is in action, regardless of the on state of the start switch. This can allow no reverse re-throwing of the starter pinion gear when the starter motor is driven with the engine running in a reverse direction or producing a back kicking just before its action stops.

The fourth object of the present invention is implemented by the following feature (7).

(7) A remote control system of the present invention comprising an engine generator, a transponder connected to a power line of the engine generator, and a remote controller for communication with the transponder over a radio link. A remote control signal is exchanged in two ways across the transponder between the engine generator and the remote controller and the remote control signal is transferred between the engine generator and the transponder over the power line of the engine generator.

According to the feature (7), the remote controller and the transponder are communicated over a radio link, thus eliminating the use of cables. Also, the exchange of the remote control signal between the engine generator and the transponder is made over the output line of the engine generator, hence eliminating the use of a dedicated cord for transmitting and receiving the remote control signal between the engine generator and the transponder. Moreover, as the radio communication is carried out over a small distance between the remote controller and the transponder, its hardware arrangement can be simple and less expensive.

BRIEF DESCRIPTION OF THE DRAWINGS

FIG. 9 is a block diagram of an arrangement of the inverter circuit shown in FIG. 8;

FIG. 20 is a diagram showing a format of the remote control signal;

FIG. 21 is a diagram illustrating an error notifying function according to the present invention;

DETAILED DESCRIPTION OF THE PREFERRED EMBODIMENTS

Figure 1:
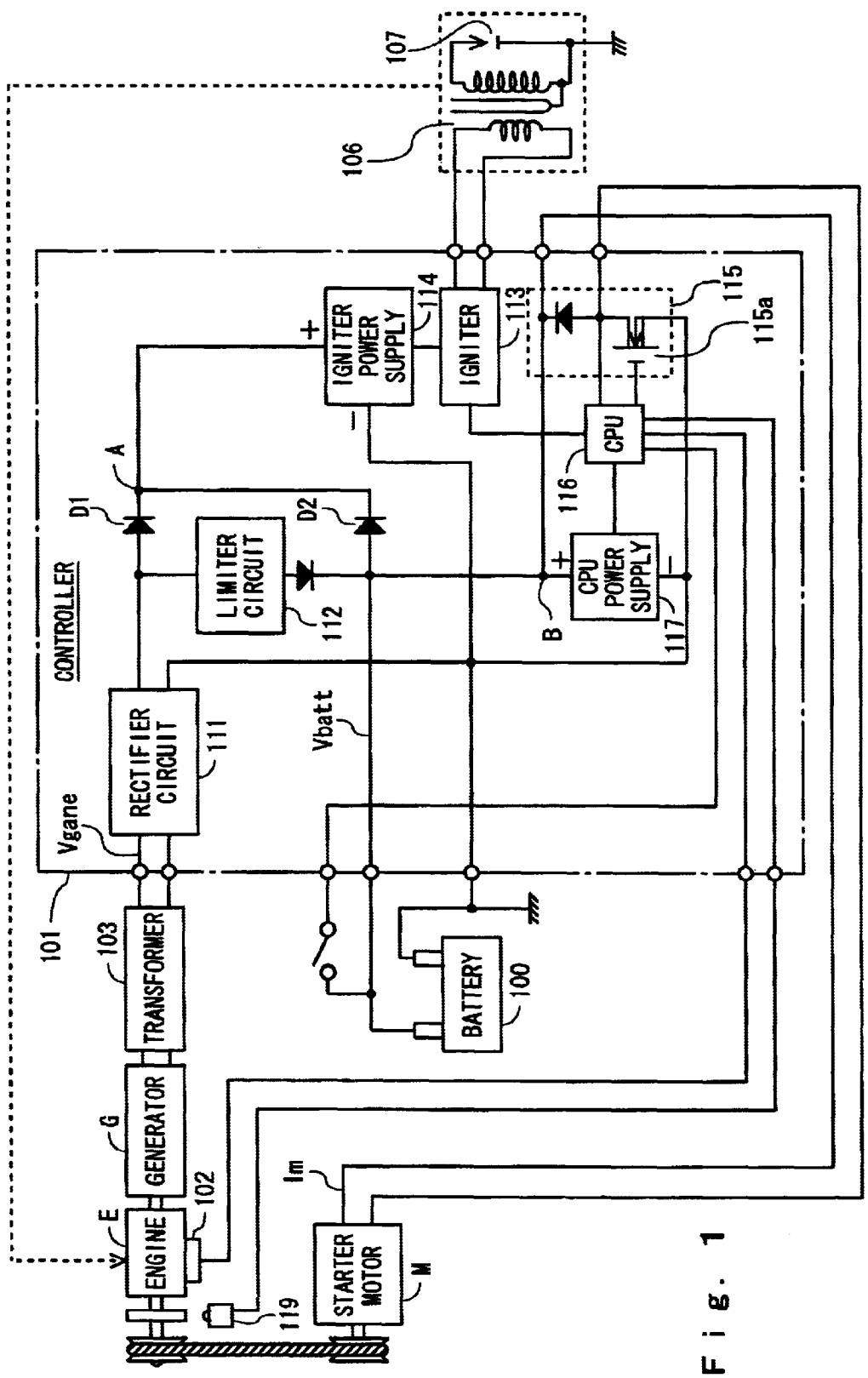
FIG. 1 is a block diagram of an engine generator showing a first embodiment of the present invention.

FIG. 1 is a block diagram of an engine generator showing a first embodiment of the present invention. A generator G is driven by an engine E. A transformer 103 down-converts an output voltage of the generator G. A controller 101 is supplied with a generator voltage Vgene from the transformer 103 and an output voltage Vbatt from a battery 100. An ignition coil 106 and an ignition plug 107 are actuated by the controller 101. A starter motor M cranks the engine E.

The controller 101 has a rectifier circuit 111 provided for rectifying the generator voltage Vgene output from the transformer 103. An igniter 113 and its power supply 114 supply the primary side of an ignition coil 106 with ignition energy. A driver 115 feeds the starter motor M with a driving current. A temperature sensor 102 measures the temperature of the engine E. A pulser coil 119 detects the rotating angle of the engine E. A CPU 116 controls the action of the igniter 113 and the driver 115 corresponding to the engine temperature and the engine rotation angle. The CPU 116 is energized from a CPU power supply 117. A limiter circuit 112 controls output voltage and current of the rectifier circuit 111.

Figure 2:
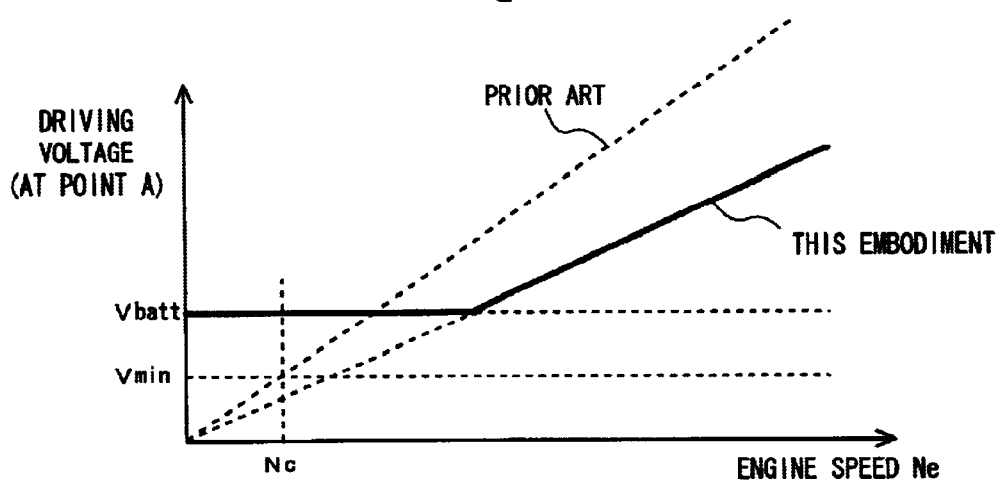
FIG. 2 is a diagram showing the relationship between the engine speed and the source voltage of an igniter as compared with that of the prior art.
Figure 3:
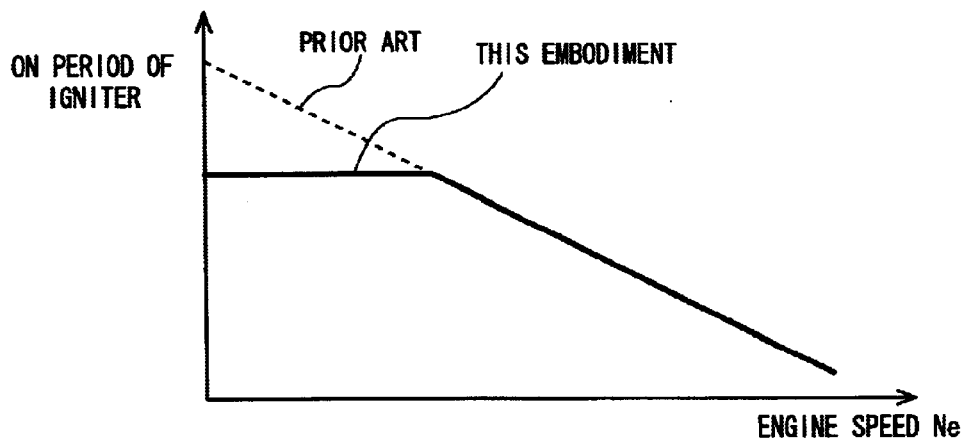
FIG. 3 is a diagram showing the relationship between the engine speed and the on period of the igniter as compared with that of the prior art.

FIG. 2 is a diagram showing the relationship between the driving voltage (at the point A in FIG. 1) of the igniter 113 and the engine speed Ne in this embodiment as compared with the prior art. Similarly, FIG. 3 is a diagram showing the on period of the igniter 113 of this embodiment in comparison with that of the prior art.

In the engine generator shown in FIG. 1, the engine E is cranked by the starter motor M at the initial action. As apparent from FIG. 2, the cranking speed Nc by the starter motor M is smaller than the complete combustion speed of the engine E. For ensuring the generator G generating a substantial level of voltage Vmin at the cranking speed Nc, an exciter coil of a relatively large size is commonly provided in the generator G. This causes the generator G to generate an excessive level of the voltage when the engine runs at a high speed.

The generator G of this embodiment includes a smaller size of the exciter coil and will not generate excessive voltage when the engine runs at a high speed. However, the cranking speed Nc may permit the generator voltage Vgene to stay smaller than the substantial voltage Vmin.

For compensation, this embodiment has the feed line of the battery 100 connected in parallel with the feed line of the generator across the rectifier circuit 111. The source line (at the point A in FIG. 1) of the igniter power supply 114 is loaded with either the generator voltage Vgene or the battery voltage Vbatt which is higher in the level. When the generator voltage Vgene is smaller than the battery voltage Vbatt at the cranking action, the source line of the igniter power supply 114 is supplied with the battery voltage Vbatt received across a diode D2. This allows the source line of the igniter power supply 114 to remain fed with a voltage greater than the battery voltage Vbatt.

When the engine is started and its speed Ne is increased, the output voltage Vgene of the rectifier circuit 111 rises up. As the output voltage Vgene of the rectifier circuit 111 exceeds the battery voltage Vbatt, it is transferred via a diode D1 to the source line of the igniter power supply 114. The more the engine speed increases, the higher the voltage on the source line of the igniter 114. Accordingly, as the engine runs at a higher speed, the on period of the igniter 113 can be shortened.

This embodiment allows the source line of the igniter power supply 114 to be supplied with the battery voltage Vbatt during the cranking period where the engine speed remains low and with the generator voltage Vgene when the engine runs at a common speed. Accordingly, without increasing the size of the exciter coils, the igniter power supply 114 is constantly energized with a substantial level of voltage regardless of the engine speed. As shown in FIG. 3, the on period of the ignition coil can thus be shortened during the cranking period where the engine speed remains low and permit the CPU 116 to spare a sufficient duration for calculating the timing of ignition at higher accuracy, hence improving the efficiency of the generation process.

A method of controlling the action of the starter motor M in this embodiment is now explained. The starter controlling method is conducted for decreasing the power consumption of the starter motor M in the initial stage of the cranking.

Figure 4:
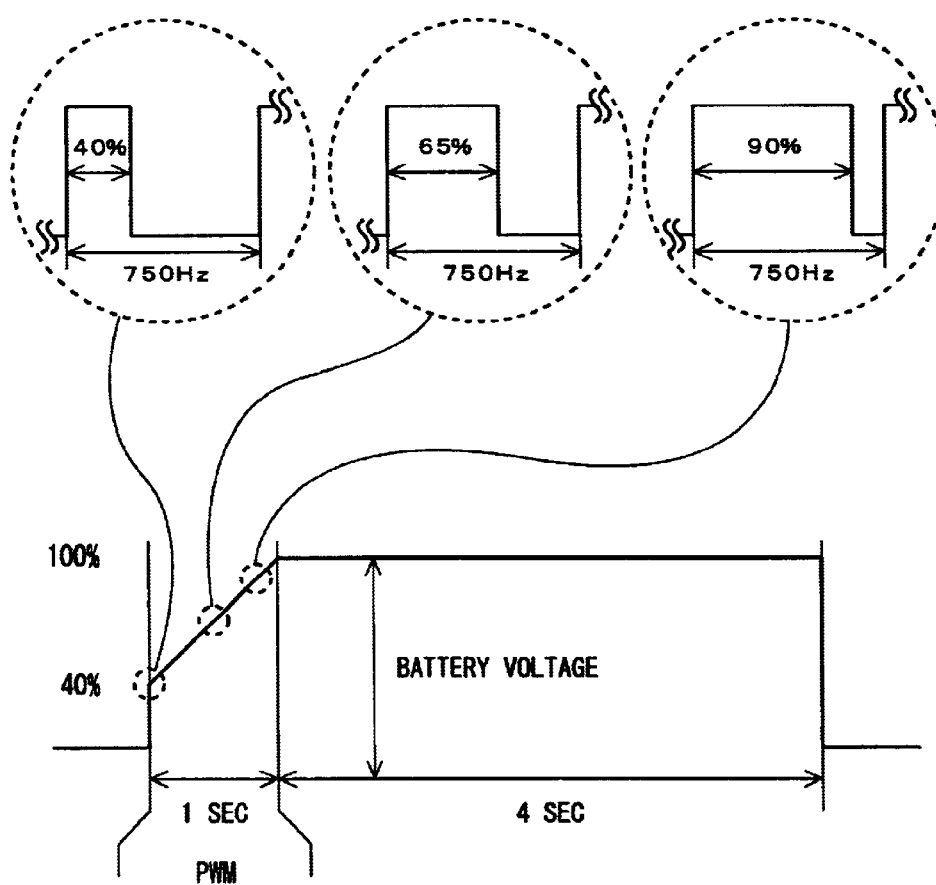
FIG. 4 is a diagram illustrating the controlling action of a starter.

The driver 115 of the controller 101 includes a power FET 115a of which the gate voltage is controlled with PWM by the CPU 116 to determine the power consumption of the starter motor M. As shown in FIG. 4, the CPU 116 gradually increases the duty ratio of the pulse signal applied to the gate of the power FET 115a from 40% to 100% for a period (one second in this embodiment) after the start of the cranking action.

Figure 5:
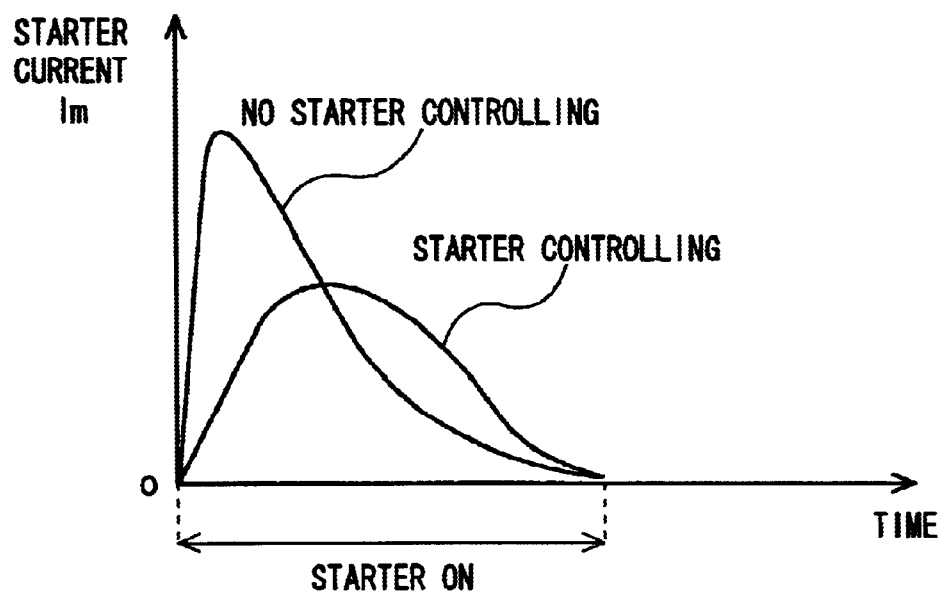
FIG. 5 is a diagram showing a profile of variation with time of the starter current as compared with that of the prior art.
Figure 6:
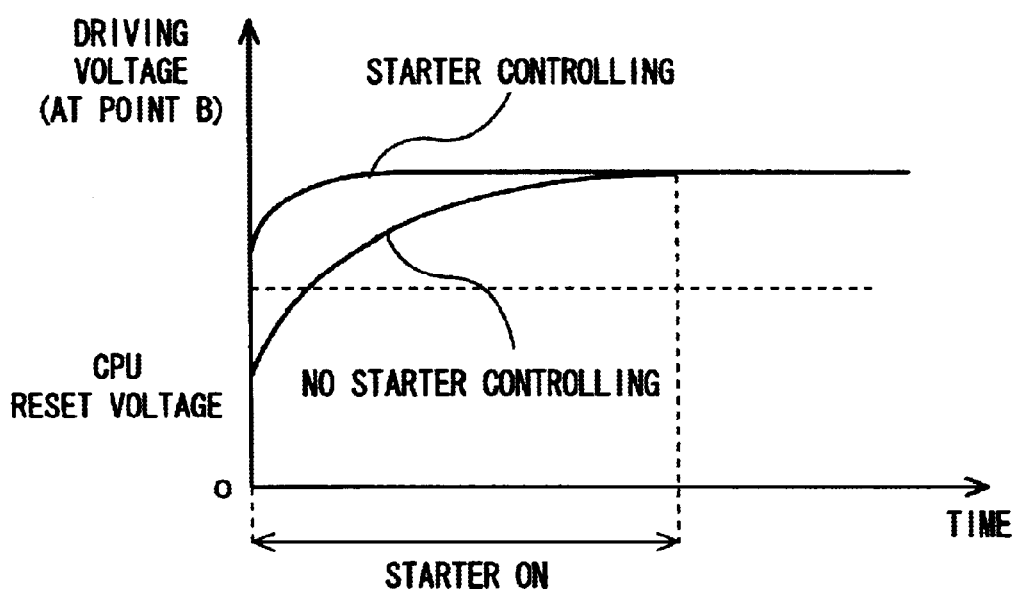
FIG. 6 is a diagram showing the relationship between the engine speed and the source voltage of a CPU as compared with that of the prior art.

FIGS. 5 and 6 are diagrams showing variation profiles of the starter current Im and the source line voltage (at the point B in FIG. 1) of the CPU 116 respectively under the starter controlling as compared with the prior art.

In this embodiment, since the duty ratio of the pulse signal applied to the gate of the power FET 115a is small in the initial stage of the cranking action, the peak of the starter current Im stays low as shown in FIG. 5. Accordingly, as shown in FIG. 6, the driving voltage of the CPU 116 in the initial stage of the cranking action can be maintained higher than the reset voltage level.

Figure 7:
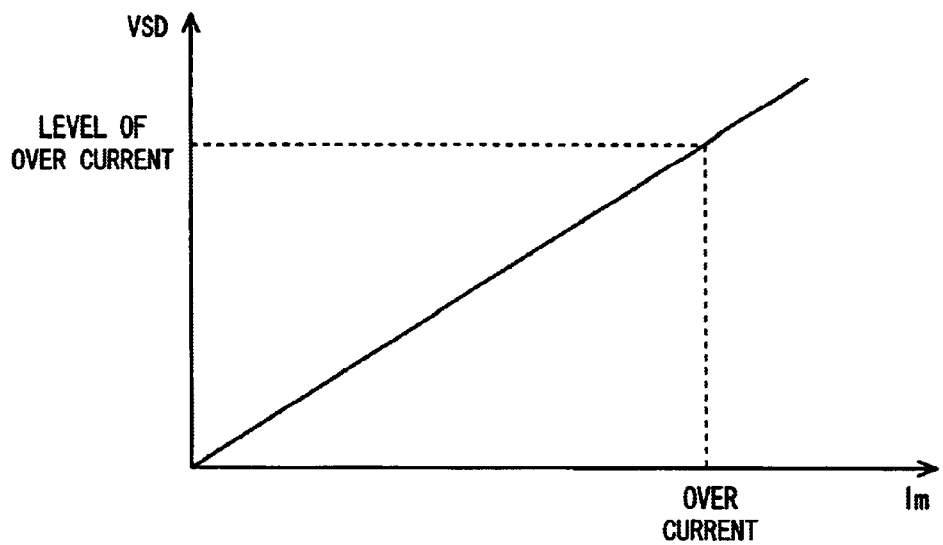
FIG. 7 is a diagram showing the relationship between the starter current Im and the source/drain voltage $V_{SD}$ of a power FET for switching the starter current Im.

A system for inhibiting seizing of the starter motor M is also explained. As the relationship between the source/drain voltage VSD of the power FET 115a of the driver 115 and the starter current Im is linear as best shown in FIG. 7, the starter current Im may be expressed by the source/drain voltage VSD.

In this embodiment, the source/drain voltage VSD of the power FET 115a is constantly monitored by the CPU 116 and when the voltage VSD rises up to a level of over current, the power FET 115a is disconnected to cancel the action of the starter motor M.

Figure 8:
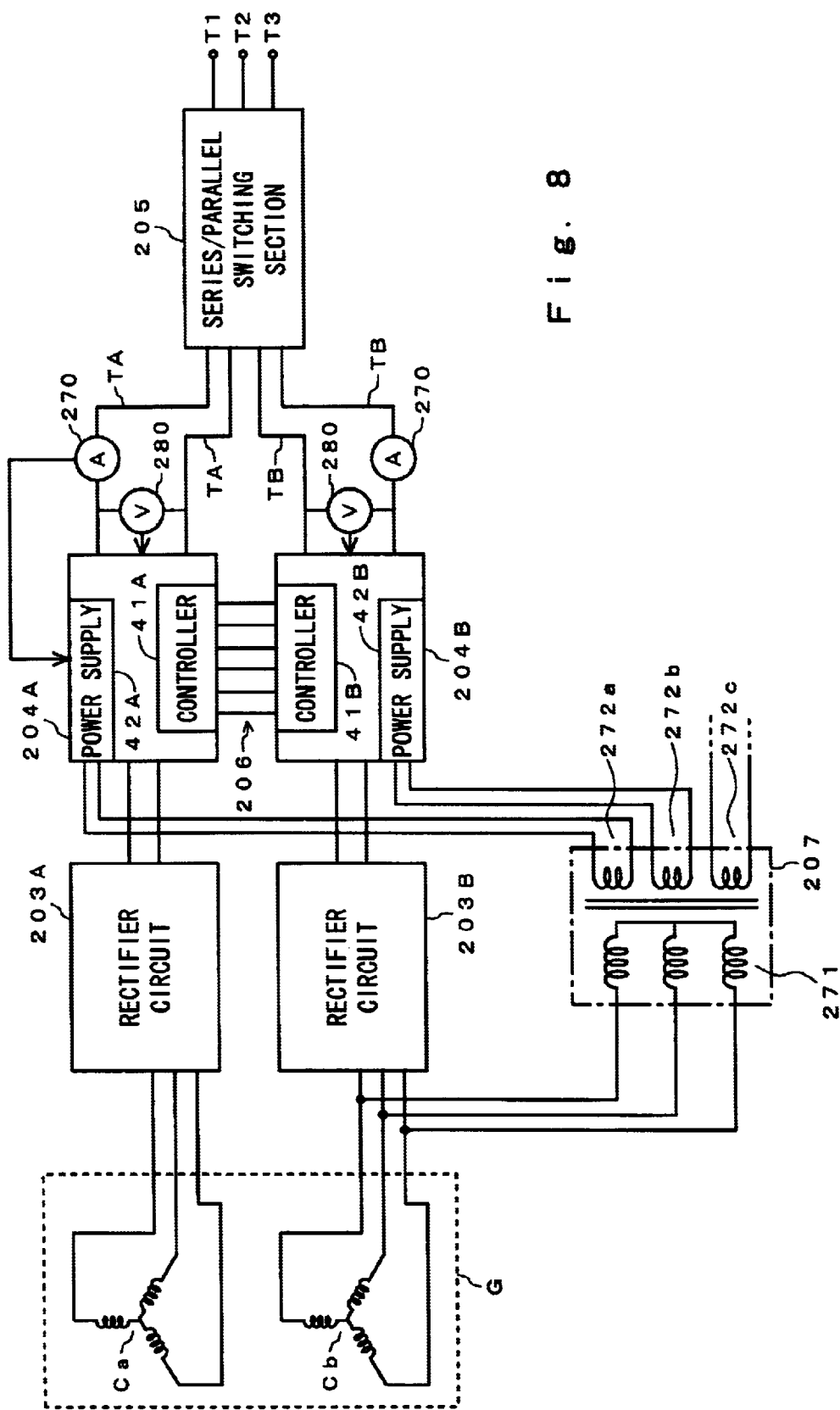
FIG. 8 is a block diagram of an overall arrangement showing a second embodiment of the present invention.

FIG. 8 is a block diagram of an arrangement of an engine generator showing a second embodiment of the present invention.

A generator G has two groups of three-phase main windings Ca and Cb, each group wound on a twelve-pole stator. The three-phase main windings Ca and Cb are connected at their output to a pair of rectifier circuits 203A and 203B respectively. The rectifier circuits 203A and 203B are then connected at their output stage to a pair of (master and slave) inverter circuits 204A and 204B respectively.

The outputs TA and TB of the two inverter circuits 204A and 204B are connected via a series/parallel switch 205 to external output terminals T1, T2, and T3. Each of the outputs TA and TB is accompanied with a current detector circuit 270 and a voltage detector circuit 280. The inverter circuits 204A and 204B have controllers 41A and 41B respectively connected to each other by a communications line 206 for transmitting and receiving control signals and sync signals for synchronous operations.

The output stage of the three-phase main winding Cb is connected to a primary coil 271 of a transformer 207. A secondary coil of the transformer 207 comprises three sub-coils 272 (272a, 272b, and 272c) The two sub-coils 272a and 272b are inverter source coils for supplying two power supplies 42A and 42B of their respective inverter circuits 204A and 204B with driving power. The sub-coil 272c is a charging coil for supplying an internal battery (not shown) with a charging current or an external direct current supply coil for supplying an external receptacle (not shown) with a DC voltage.

This embodiment allows the transformer 207 to draw parts of the output of the generator G and feed them to the inverter power supplies and the external battery charging source. More specifically, as the primary coil 271 and the secondary coil 272 of the transformer 207 are arranged to have desired winding ratios for generating required levels of power as an internal power source, the output of the generator G can favorably be utilized at desired levels thus improving the efficiency of the generation process.

In this embodiment, the transformer 207 has the three sub-coils 272a, 272b, and 272c at the second side which are arranged to have desired winding ratios for meeting the power consumption of different electric loads in the system. Accordingly, desired levels of power can correctly be drawn as the internal power supply from the main output of the AC generator G.

FIG. 9 is a block diagram showing a primary pat of the inverter circuit 204. As the two master and slave inverter circuits 204A and 204B are identical in the arrangement and function, one of them (the master inverter circuit 204A) will be described.

The output of the engine E is controlled by the opening degree of a throttle 1a. The opening degree of the throttle 1a is determined by the action of a stepping motor 1b. A rectify/smooth circuit 203 comprises a thyristor bridge circuit 203a and a smoothing circuit 203b. The smoothing circuit 203b is connected at its rear stage to the master inverter circuit 204A which includes a field-effect transistor (FET) bridge 204a and a smoothing circuit 204b. The smoothing circuit 204b is connected at its output to a series/parallel switch 205.

In the controller 41A, there are provided an oscillator 209, a frequency-dividing circuit 210, a sine-wave generating circuit 211, an electronic volume (or an amplitude controller) 212, a low-pass filter (LPF) 213 and a pulse width modulating circuit (PWM circuit) 214, a square wave converting circuit 215, a phase difference detecting circuit 216 and a starting circuit 217. For these circuits, it is possible to use ones as disclosed in Japanese Patent Application Laid-Open No. 5-244726.

The output of the oscillator 209 is divided by the frequency-dividing circuit 210 and then input to the sine-wave generating circuit 211 as a clock signal. The sine-wave generating circuit 211 generates a step-like sine-wave signal based on the clock signal. The sine-wave signal is supplied to the PWM circuit 214 through the electronic volume 212 and the LPF 213. The PWM circuit 214 issues a pulse that has been pulse-width modulated based on the reference sine-wave signal as a target waveform signal.

The electronic volume 212 controls the attenuation of the step-like sine-wave signal in the case of an overload, and the LPF 213 smoothes the step-like sine wave output from the electronic volume 212. In accordance with a pulse output from the PWM circuit 214, the gate of each FET constituting the FET bridge 204a is controlled, and an alternating current is output on the output lines TA and TA according to the sine-wave signal of the reference frequency as a reference waveform signal.

The square wave converting circuit 215 converts an output signal of the LPF 213 into a square wave. The converted signal is input to the communication port 218. The signal input to the communication port 218, that is a reference sine-wave clock, is input to the communication port of the slave 204B through the communication lines 206. The phase difference detecting circuit 216 is input with a reference sine-wave clock received from the slave 204B through the communication port 218 and is also input with a reference sine-wave clock of the master 204A from the square wave converting circuit 215.

The phase difference detecting circuit 216 compares the phases of the reference sine-wave clocks of the master 204A and the slave 204B to detect an advance or a lag in the phase, and input an advance signal or a lag phase signal that represents a result of the detection to the oscillator 209. The oscillator 209 thins out the reference sine-wave clock by a predetermined number of pulses (for example, one pulse) to slightly increase the frequency in response to the advance phase signal, while inserts a predetermined number of pulses (for example, one pulse) into the reference sine-wave clock train to slightly decrease the frequency in response to the lag phase signal. The frequency adjustment is also carried out in the slave 204B in the similar manner. In other words, the outputs of the master A and slave 204B are mutually adjusted to coincide in phase with each other.

The starting circuit 217 outputs a starting signal to energize the PWM circuit 214 for driving the master 204A which outputs a predetermined alternating current, when it detects a rising (or zero-crossing) of the reference sine-wave clock inputted from the slave 204B after the start ready signal is received from the start deciding circuit 227. In other words, after the preparation for power generation of the master 204A and slave 204B have been completed, the starting circuit 217 outputs a starting signal to the PWM circuit 214 in response to the rising (or zero-crossing) of the reference sine-wave clock.

A start deciding circuit 227 outputs a start ready signal for power generation when the engine speed and/or the output voltage of the generator G have reached predetermined values respectively and additionally the reference sine-wave clocks of the inverters 403A and 403B have been synchronized. The completion of the start ready for power generation of the slave 204B is decided based on a signal (which is to be described later) inputted to the master 204A through the communication port 218. Further, the start deciding circuit 227 outputs a preparation completion detection signal to the communication port 218 when the output voltage of the generator G and the engine speed detected by an engine speed sensor (not shown) have reached predetermined values respectively.

A comparing circuit 219 outputs an over-current signal when a current detected by the current detecting circuit 270 is larger than a threshold value. The over-current signal is input to a protecting circuit 220. The protecting circuit 220 output an overload signal to the starting circuit 217 when the over-current signal from the comparing circuit 219 has continued for a predetermined period. The electronic volume or amplitude controller 212 attenuates the amplitude of the sine-wave signal in response to the overload signal.

Figure 10:
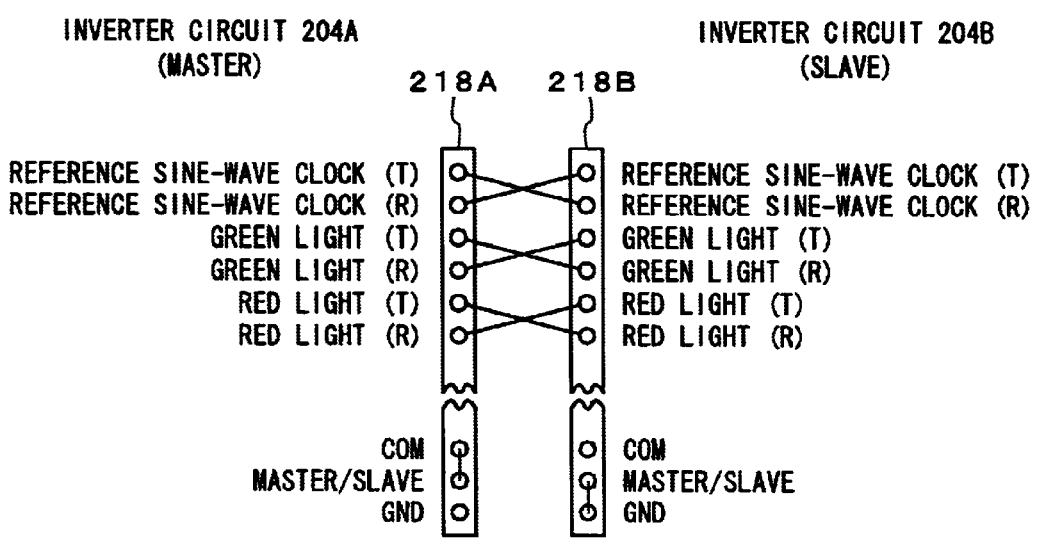
FIG. 10 is a diagram showing an arrangement of communication ports.

FIG. 10 is a view showing a relationship between the communication ports 218A, 218B of master 204A and slave 204B, in which each of the communication ports 218A and 218B has a reference sine-wave clock transmission (T) port, a reference sine-wave clock receiving (R) port, a light transmission port for a green light emission diode (LED), light receiving port for a green LED, a light transmission port for a red LED, a light receiving port for a red LED, a master/slave setting port, a common (COM) port, a ground (GRN) port. These ports are connected with the communication lines 206 as described above.

The green and red LED ports are for communicating the operating status of one of the inverters 204A and 204B to the other, respectively, with the light emission of the green LED and the red LED. When the master 204A or 204B is not ready for power generation, the green and red LEDs are extinguished in the corresponding side, while when the master 204A or 204B is ready for power generation or generates power, the green LED in the corresponding side is lighted. When an overload has been detected, the red LED is lighted.

When both inverters 204A and 204B have been ready for power generation, the start deciding circuit 227 informs the completion of the preparation for power generation to the starting circuit 217, and, at the same time, lights the green LED and maintains the lighting. In other words, when the AND-logic of the two green LED's lighting in both sides is established, the preparation for power generation is completed. When an overload has been detected in any one of the inverters 204A and 204B during a power generation, a stop command is outputted to the PWM circuit 214 from the starting circuit 217. In other words, when the OR-logic of the two red LEDs is established, the power generation is stopped.

Figure 11:
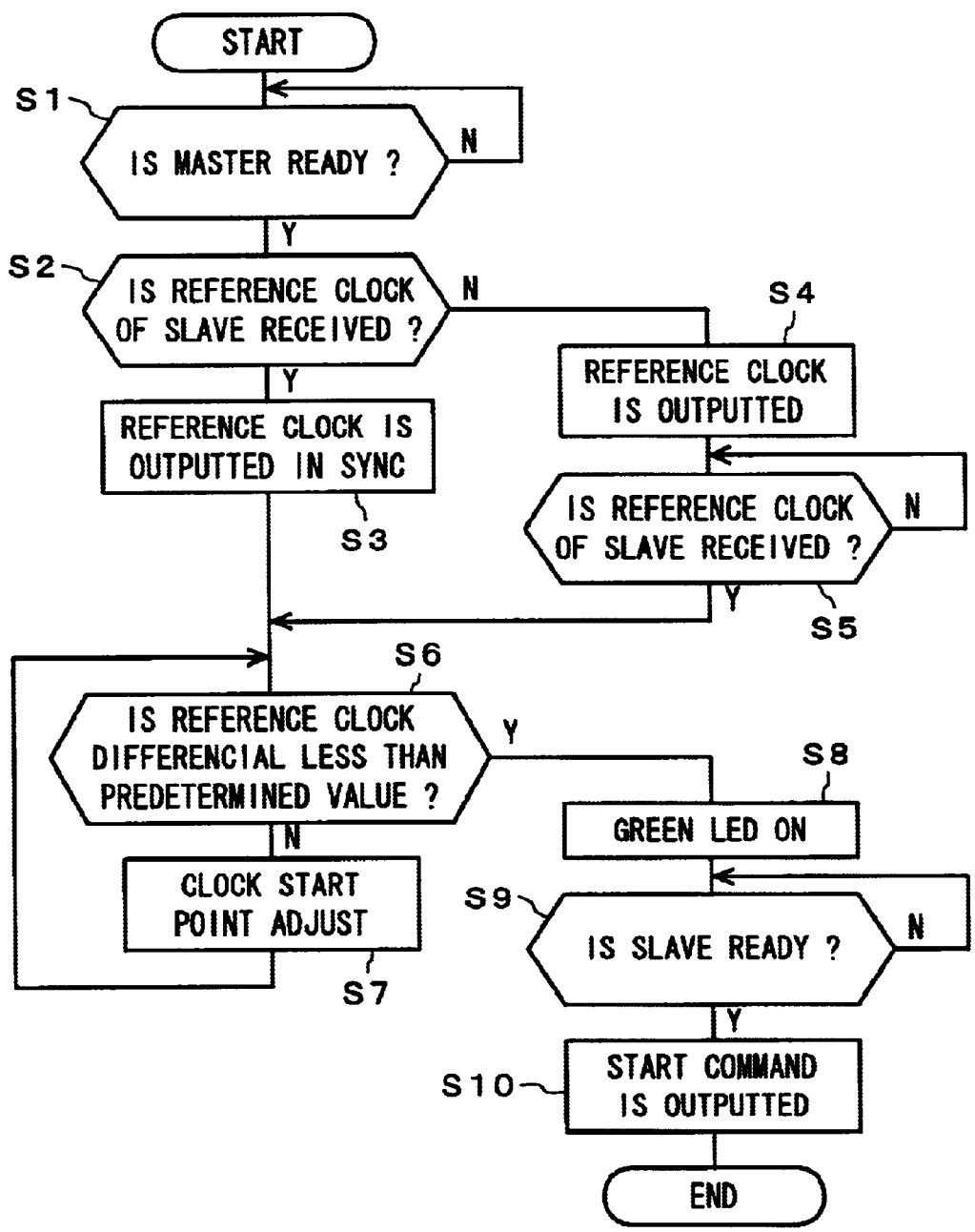
FIG. 11 is a flowchart showing a procedure of controlling the action of the inverter circuit.

The power generation starting operation of the generator will be explained with reference to a flowchart in FIG. 11. Referring to FIG. 11, at step S1, a decision is made as to whether the preparation for power generation by the master 204A is completed or not depending on whether the engine speed and/or power source voltage have exceeded predetermined values respectively. If the decision is affirmative, the process proceeds to step S2, and a decision is made as to whether a reference sine-wave clock is received from the slave 204B or not. If the decision is affirmative, the process proceeds to step S3.

The reference sine-wave clock of the own device (master 204A) is outputted in synchronism with a zero-cross point (starting point) of the reference sine-wave clock of the slave 204B at step 3, and then the process proceeds to step S6. When, on the other hand, the reference sine-wave clock is not received from the slave 204B, the process proceeds to step S4, and the reference sine-wave clock is started to be outputted. At step S5, a decision is made as to whether the reference sine-wave clock is received from the slave 204B or not. If the decision is affirmative, the process proceeds to step S6.

At step S6, a decision is made as to whether the phase difference between the reference sine-wave clocks of the master 204A and slave 204B is less than a predetermined value or not. If the decision is negative, the process proceeds to step S7, and the frequency or phase of the reference sine-wave clock is finely adjusted to correct the starting point thereof. When the phase difference has become less than the predetermined value by the correction of the starting point, the process proceeds to step S8, and the green LED is lighted to display the preparation completion for power generation. At step S9, a decision is made about the status of the green LED light from the slave 204B to decide whether the slave 204B is also ready for power generation or not. If the decision at the step S9 is affirmative, the process proceeds to step S10, and a start command is outputted to the PWM circuit 214 in synchronism with a zero-cross point (starting point) of the reference sine-wave clock.

Figure 12:
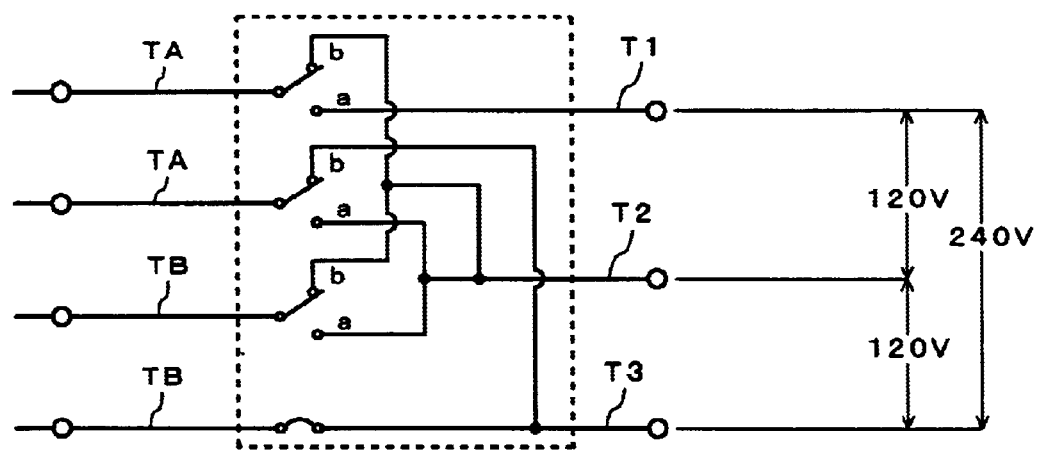
FIG. 12 is a diagram showing a connection arrangement of a series/parallel switch.

The series/parallel switching of the two power generation sections will be explained. FIG. 12 is a circuit diagram showing a detail of the series/parallel switching section 205. In FIG. 12, the series/parallel switching section 205 may be structured by a toggle switch. While the switch is changed over to one contact "a", the output voltage (for example, 120 V) of the master 204A is outputted across the output lines T1 and T2, and the output voltage (for example, 120 V) of the slave 204B across the output lines T2 and T3. As a result, the output voltage (240 V) that is two times the output voltage of each master 204A and slave 204B is obtained across the output lines T1 and T3. In other words, the output voltages of the master 204A and slave 204B are connected in series.

While the switch is changed over to the other contact "b", there is no voltage across the output lines T1 and T2, and the output voltages (for example, 120 V) of both inverters 204A and 204B are outputted only on the output lines T2 and T3. As a result, both output voltages (120 V) of the master 204A and slave 204B are outputted across the output lines T2 and T3 without any changes, and the output power (for example, each of 2 kW) appears in two times (4 kW). In other words, both master 204A and 204B are connected in parallel.

Figure 13:
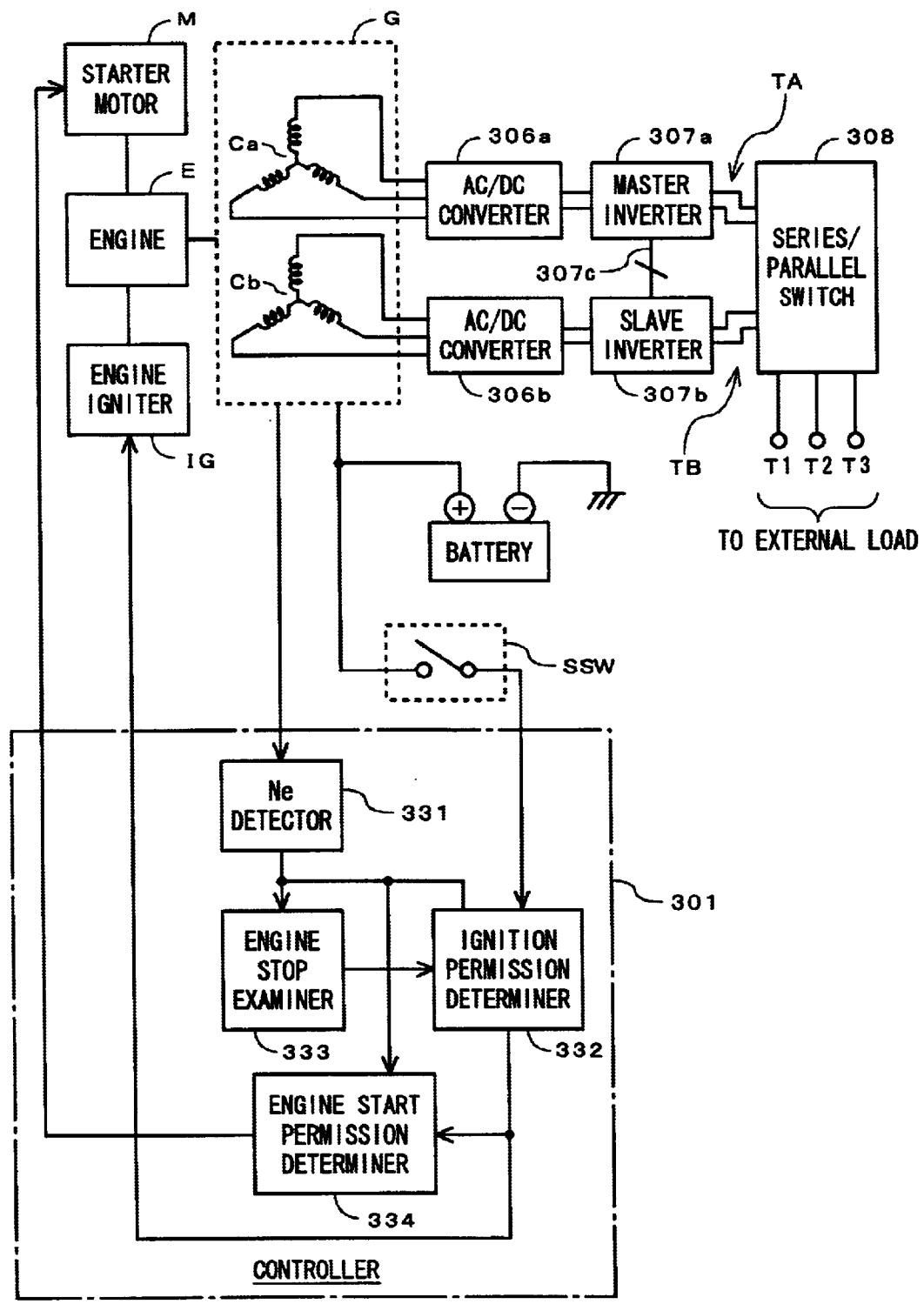
FIG. 13 is a block diagram showing a third embodiment of the present invention.

FIG. 13 is a block diagram of an arrangement of an engine generator showing a third embodiment of the present invention.

A generator 5 has two three-phase main windings Ca and Cb. The two three-phase main windings Ca and Cb are connected at their output to a pair of AD/DC converters 306a and 306b respectively. The two AC/DC converters 306a and 306b are then connected at their output stage to a master inverter 307a and a slave inverter 307b respectively. A starter motor M and an engine igniter IG for cranking the engine E are controlled by the action of a controller 301 and a start switch SSW which will be explained later.

The outputs TA and TB of their respective inverters 307a and 307b are connected via a series/parallel switch 308 to external output terminals T1, T2, and T3. The two inverters 307a and 307b are also connected to each other by a communications line 307c for transmitting and receiving controls signals and sync signal for synchronous operations.

Figure 14:
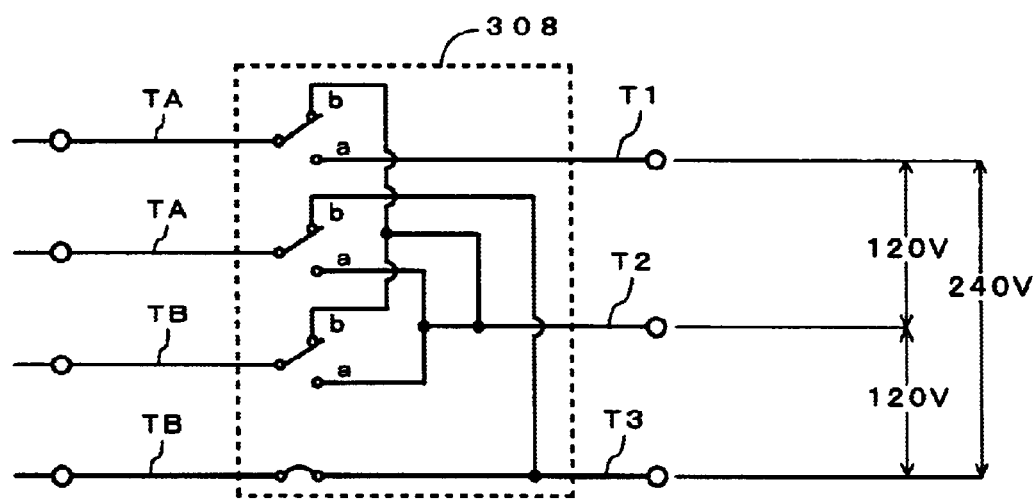
FIG. 14 is a circuitry diagram showing details of the series/parallel switch shown in FIG. 13.

FIG. 14 is a circuit diagram showing a detail of the series/parallel switching section 308. The series/parallel switching section 308 may be structured by a toggle switch. While the switch is changed over to one contact "a", the output voltage (for example, 120 V) of the master 307a is outputted across the output lines T1 and T2, and the output voltage (for example, 120 V) of the slave 307b across the output lines T2 and T3. As a result, the output voltage (240 V) that is two times the output voltage of each master 307a and 307b is obtained across the output lines T1 and T3. In other words, the output voltages of the master 307a and slave 307b are connected in series.

While the switch is changed over to the other contact "b", there is no voltage across the output lines T1 and T2, and the output voltages (for example, 120 V) of both master 307a and slave 307b are outputted only on the output lines T2 and T3. As a result, both output voltages (120 V) of the master 307a and slave 307b are outputted across the output lines T2 and T3 without any changes, and the output power (for example, each of 2 kW) appears in two times (4 kW). In other words, both master 307a and slave 307b are connected in parallel.

Returning back to FIG. 13, the controller 301 has an Ne detector 331 provided for detecting the engine speed Ne from a pulse signal generated in synchronization with the revolution speed of the generator G. An engine stop examiner 333 examines from the engine speed detected by the Ne detector 331 whether the engine E is in its stop state or not. An ignition permission determiner 332 then permits or inhibits the action of the engine igniter IG.

Figure 15:
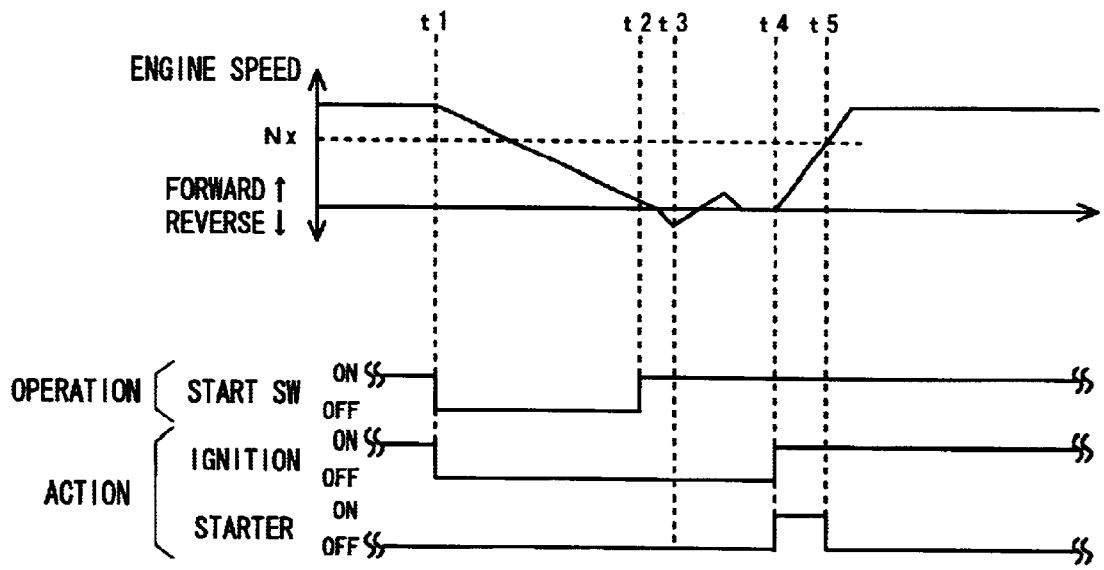
FIG. 15 is a (first) timing chart illustrating the actions of a controller.
Figure 16:
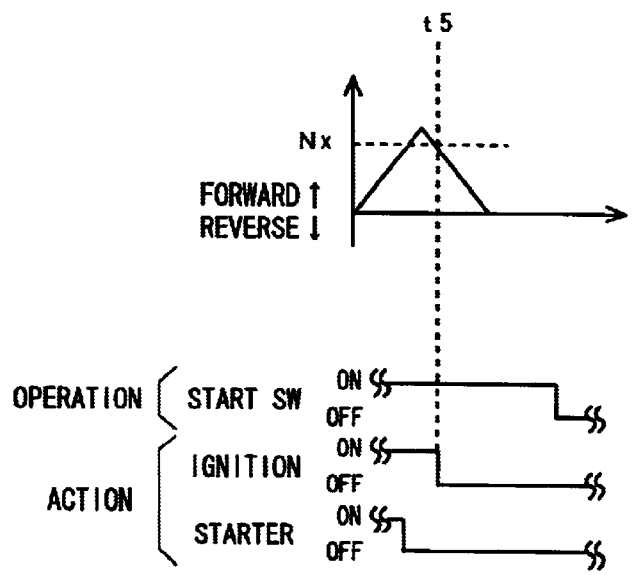
FIG. 16 is a (second) timing chart illustrating the actions of the controller.

FIGS. 15 and 16 are timing charts illustrating the action of the controller 301.

When the start switch SSW is switched from the on state to the off state at the time t1 during the operation of the engine, the determiner 332 detects its switching action and inhibits the igniting action of the engine igniter IG. When the starter switch SSW is turned at t2 prior to the stop of the engine E, the two determiners 332 and 334 refers to the result of the engine stop examiner 333.

As the engine is in its action at t2, the determiner 332 permits no igniting action of the engine igniter IG and the determiner 334 permits no operation of the starter motor M.

More particularly, when the starter switch SSW is switched on at t2 and the piston arrives at the upper dead point in the compression process, the engine is not ignited thus generating no back kicking.

In this embodiment, the starter motor M remains deenergized upon the start switch SSW being switched on at t3 when the piston fails to complete the compression process and the engine runs in a reverse direction, hence inhibiting reverse re-throwing of the pinion gear.

When the engine speed is zero and its condition continues for a specific length of time, the engine stop examiner 333 judges at t4 that the engine is in no action. When receiving the judgment from the examiner 333 and finds that the start switch SSW remains turned on, the two examiners 332 and 334 permit the igniting action of the engine igniter IG and the start of the starter motor M respectively. As a result, the engine E is cranked by the action of the starter motor M and ignited by the action of the igniter IG.

At t5, when the engine speed exceeds a complete combustion speed Nx, the engine start permission determiner 334 cancels the action of the starter motor M regardless of the on state of the start switch SSW. The complete combustion speed Nx has been set between the engine speed in the cranking action and the minimum engine speed in the complete combustion state.

As shown in FIG. 16, when the engine speed which is higher than the complete combustion speed is declined to lower than the complete combustion speed Nx at t5 without the starter switch SSW being turned off, the ignition permission determiner 332 judges that the engine fails to start up and inhibits the igniting action of the engine igniter IG. Accordingly, the engine E is not ignited when the piston reaching at the upper dead point in the compression process, hence avoiding the generation of back kicking.

Figure 17:
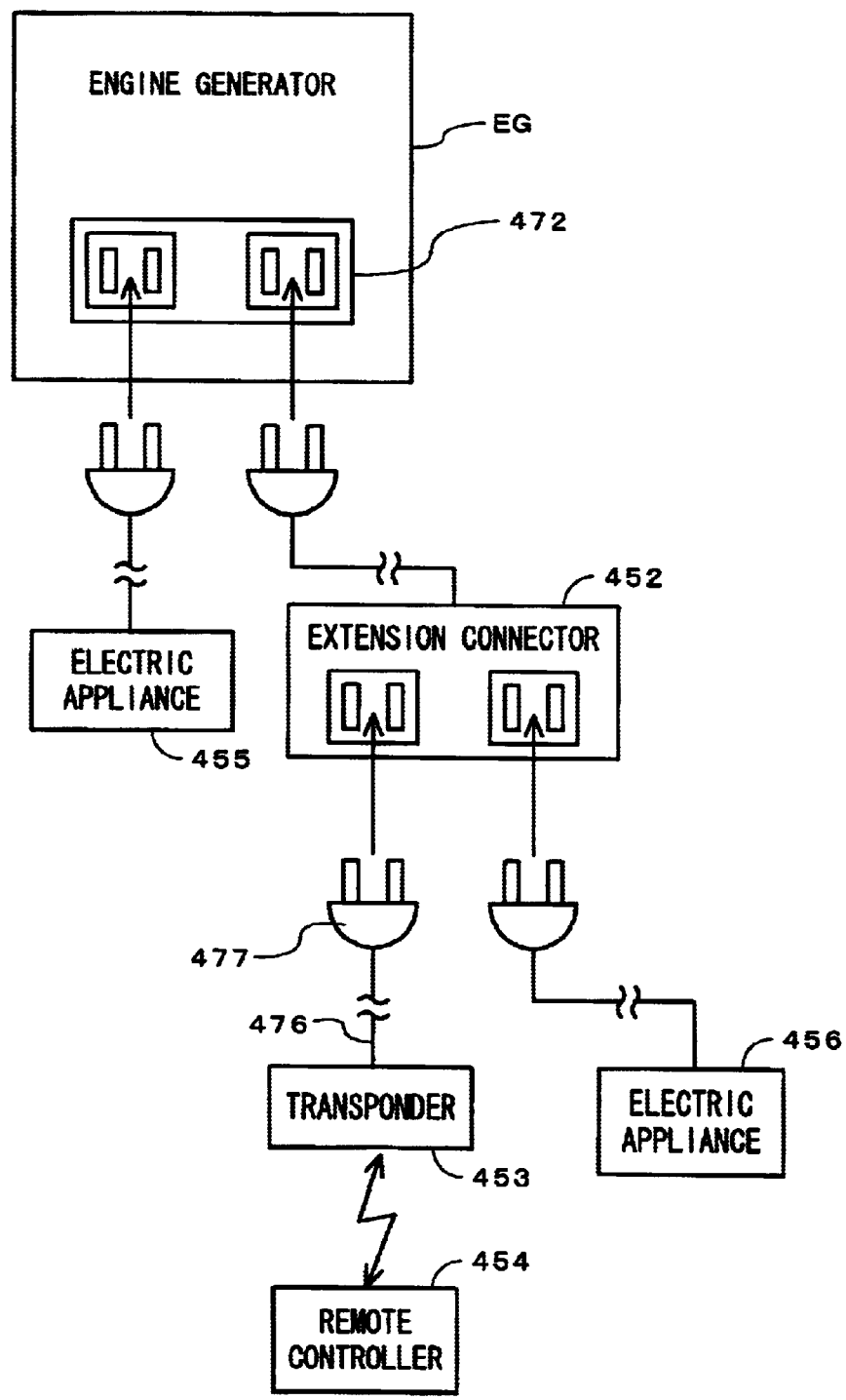
FIG. 17 is a block diagram of a remote control system for an engine generator showing a fourth embodiment of the present invention.

FIG. 17 is a block diagram of a remote-control system for the engine generator showing a fourth embodiment of the present invention.

The engine generator EG includes an engine and a generator driven by the engine. An output (power) line of the generator is connected to a receptacle connector 472. The receptacle connector 472 can be linked with directly an electric appliance 455 or an extension connector 452.

The extension connector 452 is provided for supplying a power to an electric appliance 456 located far from the engine generator EG. The extension connector 452 may be connected with a plug 477 of a transponder 453. The transponder 453 is provided for communications with remote-control signals between the engine generator EG and a remote controller 454 and connected by a ratio link with the remote controller 454 and by a power line link with the engine generator EG.

Figure 18:
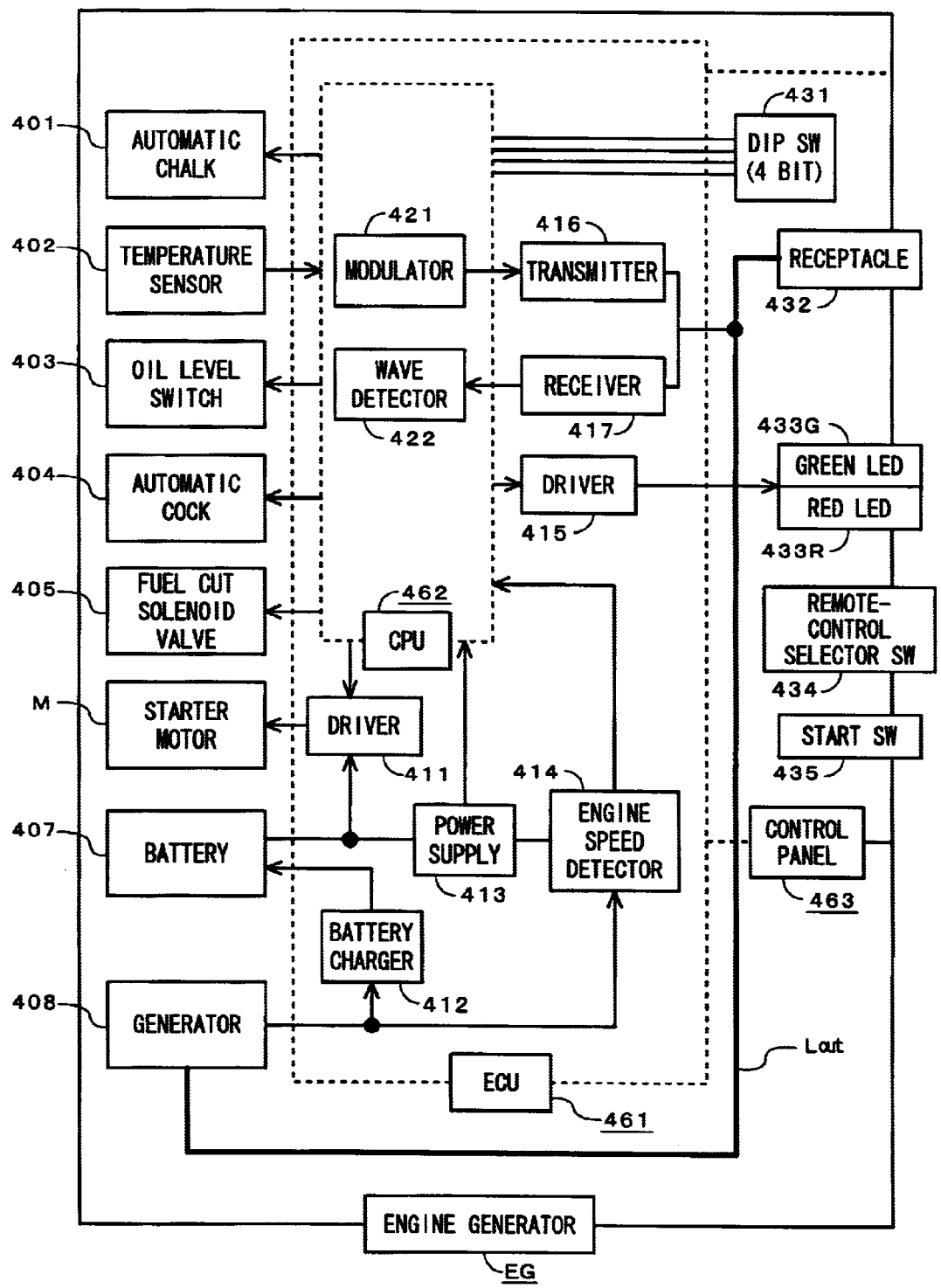
FIG. 18 is a block diagram showing a primary part of the engine generator.

FIG. 18 is a block diagram of a primary part of the engine generator EG. Illustrated are an ECU (engine control unit) 461 including a CPU 462, a control panel 463, an automatic chalk 401 for controlling the ratio between fuel and air of a fuel gas to be supplied to the engine (not shown), a temperature sensor 402 for measuring the temperature of the engine, a oil level switch 403 for detecting the level of an engine oil, an automatic cock 404 for supplying the engine with a fuel, a fuel cutoff solenoid valve 405 for canceling the supply of fuel to the engine, a starter motor M for cranking the engine, a battery 407 for energizing the starter motor M, and the generator 408 driven by the engine.

The control panel 463 has a (four bit) DIP switch 431 for address setting, a receptacle 432 which can be joined with a plug of an electric appliance, a pair of green and red diodes (or LEDs) 433G and 433R for indicating the operating state of the engine generator EG, a remote-control selector switch 434 for enabling and disabling the remote control action with the remote controller 454, and a start switch 435 for driving the starter motor M.

The CPU 462 includes a modulator circuit 421 for modulating and superimposing the remote control signal on the line signal of an output line Lout to be transmitted from a transmitter circuit 416 to the remote controller 454 and a detector circuit 422 for extracting the remote-control signal from the line signal received over the output line Lout.

The ECU 461 comprises a power supply 413 for converting a battery voltage into a logic voltage, an engine speed detector 414 for detecting the engine speed, a battery charger 412 for charging the battery 407 with a part of the output of the generator 408, a LED driver 415 for actuating a pair of green and red LED 433G and 433R, and another driver 411 arranged responsive to a command from the CPU 462 for driving the starter motor M.

Figure 19:
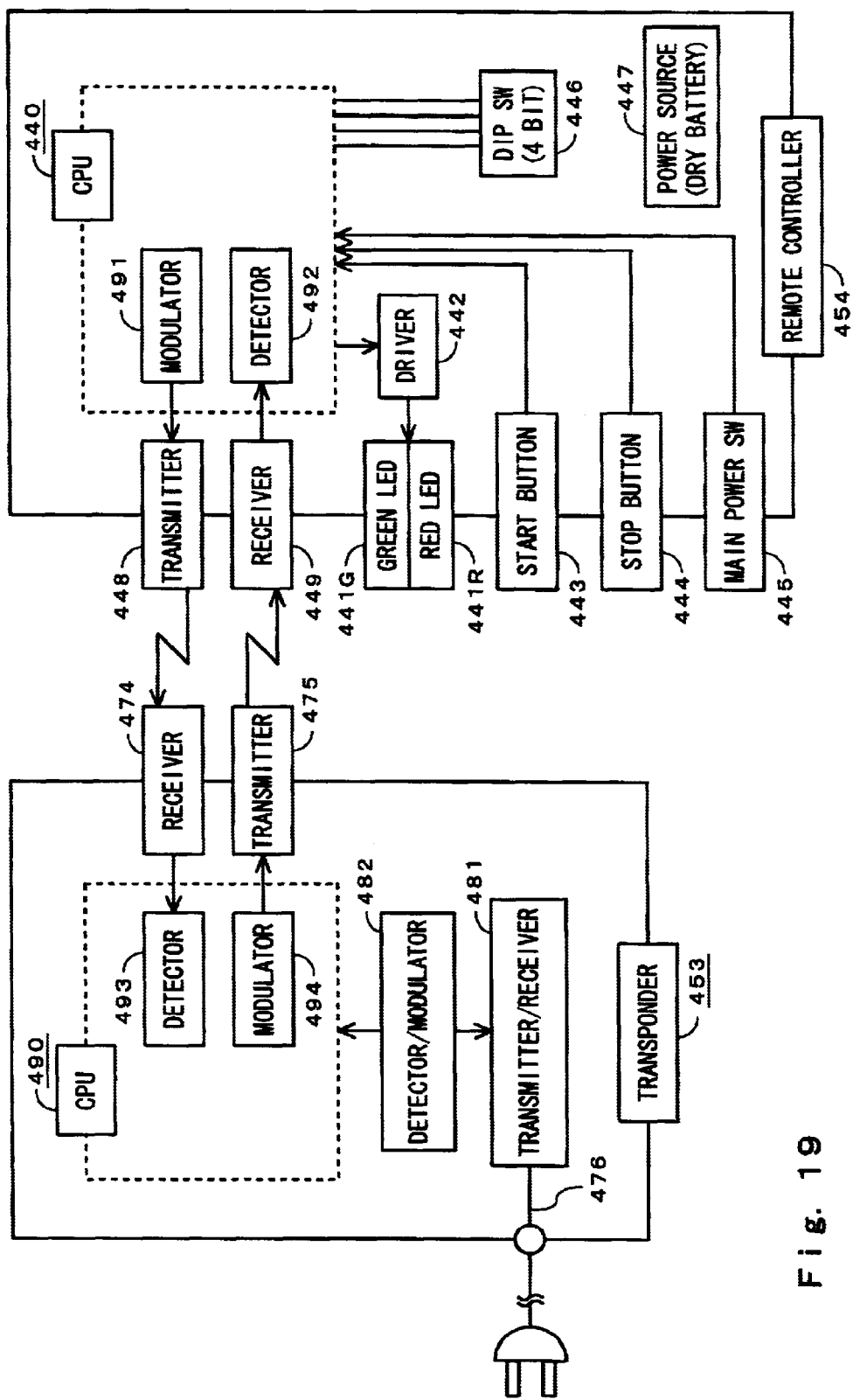
FIG. 19 is a block diagram showing arrangements of a transponder and a remote controller.
Figure 22:
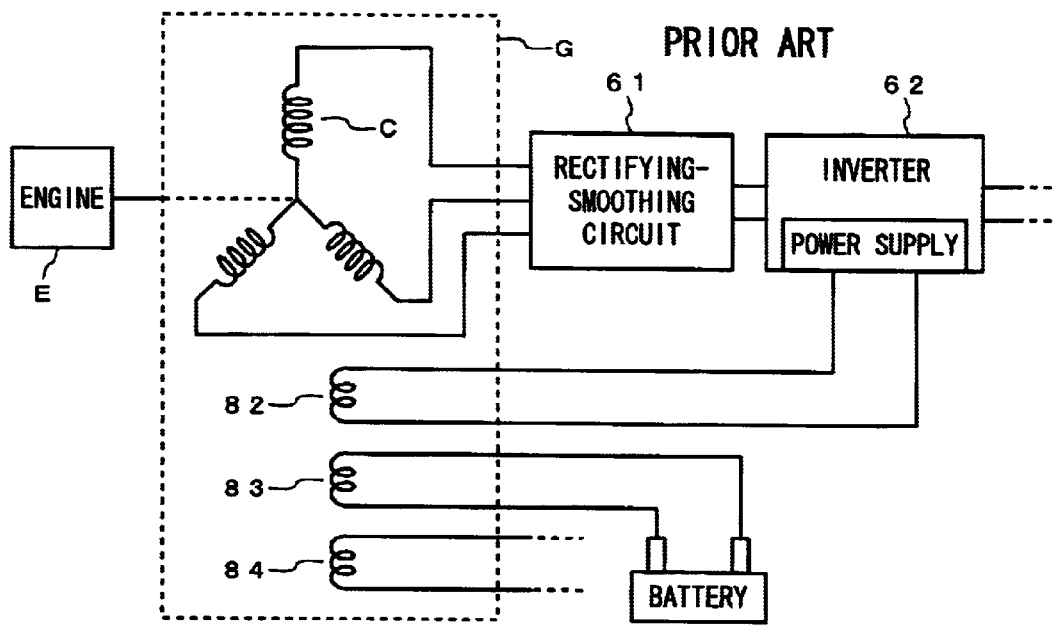
FIG. 22 is a block diagram of a prior art.
Figure 23:
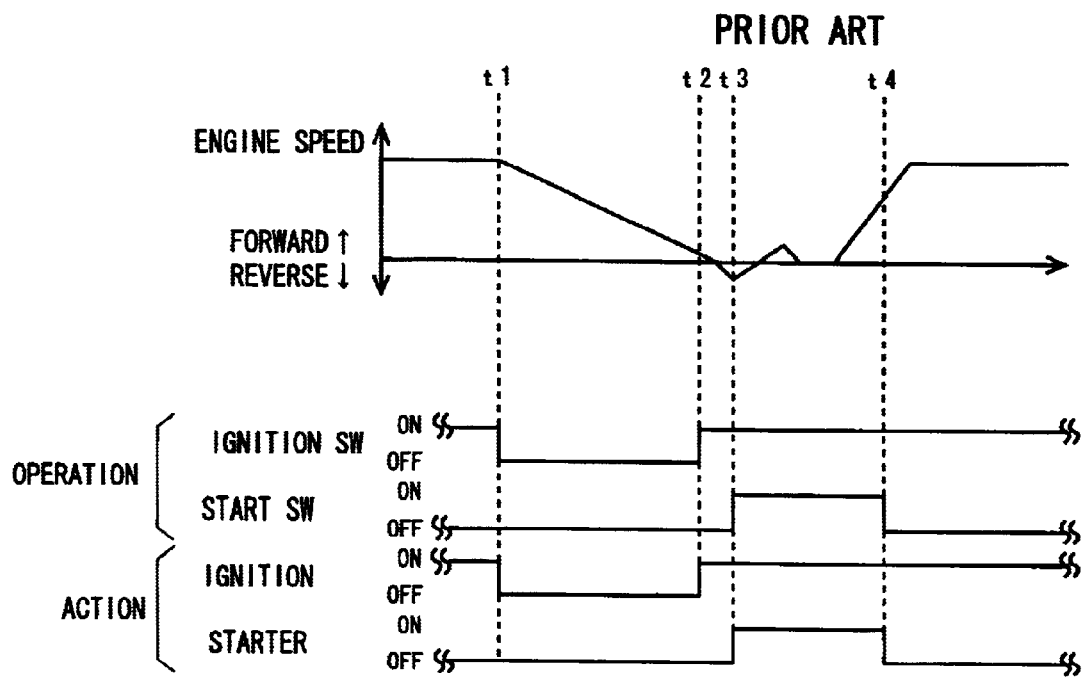
FIG. 23 is a (first) timing chart illustrating the actions of a prior art controller.
Figure 24:
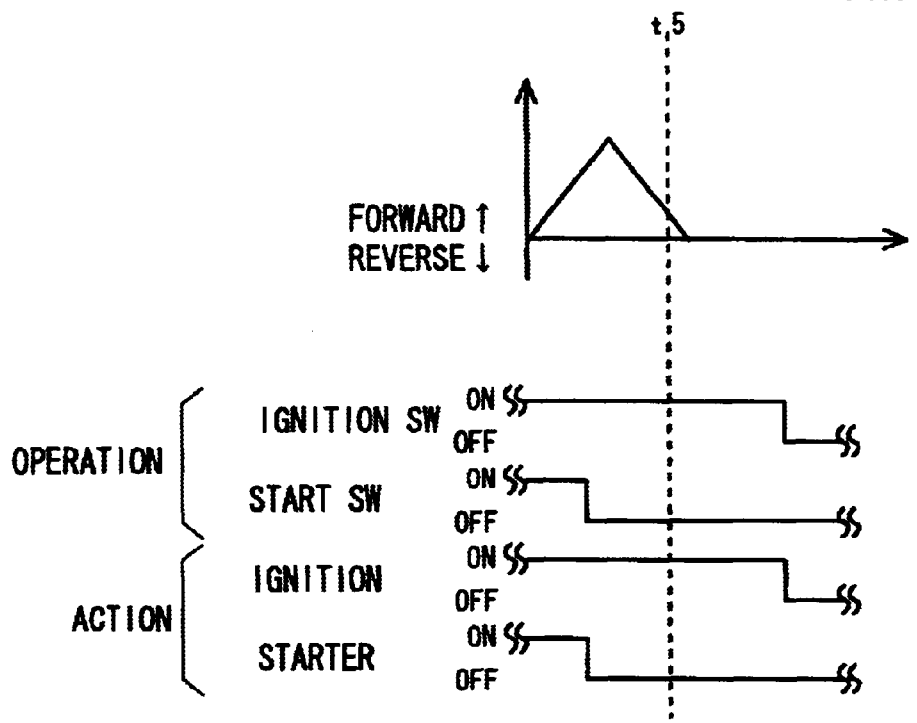
FIG. 24 is a (second) timing chart illustrating the actions of the prior art controller.

FIG. 19 is a block diagram showing a primary part of the transponder 3 and the remote controller 454.

The transponder 453 comprises a transmitter/receiver circuit 481, a detector/modulator circuit 482, a receiver 474 and a transmitter 475 for radio communication with the remote controller 454, and a CPU 490 including a detector 493 and a modulator 494.

The transmitter/receiver circuit 481 has a receiver function for receiving signal components superimposed on the generator power on a power line 476 and a transmitter function for superimposing the remote control signal on the generator power and transmitting it over the power line 476. The circuit 482 has a detector function for extracting the remote control signal from the line signal received by the transmitter/receiver circuit 481 and a modulator function for modulating a binary data supplied from the CPU 490 into the remote control signal.

The remote controller 454 comprises a CPU 440 including a modulator 491 and a detector 492, a pair of green and red light emitting diodes (LEDs) 441G and 441R for indicating the operating state of the engine generator EG, a driver 442 for actuating the LEDs 411, a start button 443 for starting the engine generator EG, a stop button 444 for stopping the engine generator EG, a main power switch 445 for the remote controller 454, a (four bit) DIP switch 446 for address setting, a power source (dry battery) 447 for energizing the components of the remote controller 454, a transmitter 448 for transmitting a remote control signal generated by the CPU 440, and a receiver 449 for receiving the remote control signal from the transponder 453.

FIG. 20 illustrates a format of the remote control signal to be transmitted from the remote controller 454 to the engine generator EG.

In this embodiment, the remote control signal is an 8-bit signal. The upper four bits represent an address code ("0101" in this embodiment) for identifying the engine generator EG to be operated. The lower four bits may be a control code, such as a start code "0001" or a stop code "0010", for controlling the action of the engine generator EG.

When the start button 443 on the remote controller 4 of wireless type is depressed by an operator, the CPU 440 combines the start code "b 0001" and the address code determined by the DIP switch to generate a remote control signal (FIG. 20). The remote control signal is frequency modulated by the modulator 491 and released from the transmitter 448. The remote control signal is then intercepted by the receiver 474 of the transponder 453 and detected by the detector 493 in its CPU 490. The remote control signal detected by the CPU 490 is modulated by the circuit 482 and superimposed on the generator output over the power line 476 by the transmitter/receiver circuit 481 before transferred via the extension connector 452 over the power line.

In the engine generator EG (FIG. 18), the remote control signal superimposed on the line signal Lout is received by the receiver 417 of the ECU 461 and detected by the detector 422 of the CPU 462. The CPU 462 compares the address code in the remote control signal with the address code assigned to the controller 454 as determined by the DIP switch 431. When the two addresses are identical, the command code in the remote control signal is translated and its commanding action is conducted.

In the CPU 462, the remote control signal is modulated by the modulator 421 and superimposed on the generator output from the transmitter 416 before transmitted over the power line. The remote control signal is transmitted in a reverse manner to the wireless remote controller 454. The wireless remote control 454 when receiving its remote control signal once transmitted recognizes that the remote control has correctly been received by the engine generator EG. If the wireless remote controller 454 fails to receive a reply of the remote control signal after a particular length of time from the transmission of the remote control signal, it dispatches the remote control signal once again.

The engine generator EG in response to the remote control signal from the remote controller 454 starts its action, registers its control code on the remote control signal, and transmits them together with its address code. The remote control signal carrying the codes is then received by the remote controller 454 which in turn judges that the engine generator EG runs in a normal condition and lights up the green LED 441G.

In case that the engine generator EG nearly exhausts a volume of engine oil and the oil level switch 403 is closed, it combines its address code determined by the DIP switch 431 with an error indicator code (e.g. of four bits) and dispatches them over the radio link to the wireless remote controller 454.

When receiving the remote control signal carrying the error indicator code, the wireless remote controller 454 lights up the green LED 441G and the red LED 441R depending on the error in the engine generator EG.

FIG. 21 is a diagram showing the relationship between the error developed in the engine generator EG, the condition of the engine generator EG at the development of the error, and the state of the LEDs 443G and 443R (441G and 441R).

When engine generator EG nearly exhausts the engine oil and the oil level switch 403 is closed, the action of the engine generator EG is canceled with the green LEDs 433G and 441G turned off but the red LEDs 433R and 442R turned on. More particularly, as the temperature of the engine generator EG rises up, its rise over 250° C. is measured by the temperature sensor 402 and the action of the engine generator EG is canceled. While the green LEDs 433G and 441G are turned off, the red LEDs 433R and 441R flash on and off at intervals of one second.

When the engine is cranked at a predetermined number of revolutions or for a predetermined length of time by the starter motor M but fails to be combusted, the engine generator EG cancels its restart. Simultaneously, while the green LEDs 433G and 441G are turned off, the red LEDs 433R and 441R flash on and off at intervals of five seconds.

When the engine E stalls, the action of the engine generator EG is canceled. Then, the green LEDs 433G and 441G are turned off and the red LEDs 433R and 441R flash on and off at intervals of a ½ second.

When the automatic cock solenoid valve 404 or the fuel cutoff solenoid valve 405 draws an over-current and it is judged that an automatic cock error or a fuel cutoff error occurs, the action of the engine generator EG is canceled. Then, the green LEDs 433G and 441G are turned off and the red LEDs 433R and 441R flash on and off at intervals of one second and a ½ second alternately.

When the battery voltage Vbatt increases to higher than 16 V or decreases to lower than 7 v during the non operation of the starter motor M and it is judged that a battery error occurs, the action of the engine generator EG is canceled. Accordingly, the green LEDs 433G and 441G are turned off and the red LEDs 433R and 441R flash on and off at intervals of one second and a ½ second alternately.

The advantages of the present invention are as follows:

(1) The driving voltage supplied from the igniter of the controller to the primary side of the ignition coil is not declined when the power consumption of the battery increases at the startup of the starter motor. This allows the on period of the igniter to be shortened during the cranking action of the starter motor, hence ensuring the duration for the CPU calculating the timing of ignition. Accordingly, as the timing of ignition is calculated at higher accuracy, the engine generator can be improved in the efficiency of power generation and its controller can be implemented.

(2) The driving current of the starter motor is decreased during the cranking action to minimize the power consumption of the battery and hence the decrease of the source voltage in the controller. Accordingly, the driving voltage of the CPU mounted in the controller can be maintained higher than the reset voltage.

(3) A part of the output of the AC generator is drawn through the transformer and used as the internal power source for energizing the inverter and recharging the battery. As the ratio between the primary coil and the secondary coil of the transformer is determined to meet the requirement of power as the internal power supply, the output of the AC generator can be used at higher efficiency and released at higher effectiveness.

(4) The second side of the transformer is implemented by two or more sub-coils of which the windings are determined corresponding to the power consumption of the electric loads energized from the internal power supply. This allows the power for the internal power supply to be drawn at higher accuracy from the main output of the AC generator, thus improving the efficiency of power generation.

(5) The engine igniter remains inactivated even if the start switch is turned on with the engine in action. Accordingly, no back kicking will occur when the start switch is turned on before the engine stops.

(6) The starter motor remains inactivated even if the start switch is turned on with the engine in action. Accordingly, there will be no chance of reverse re-throwing of the start pinion.

(7) The action of the starter motor is canceled when the engine speed exceeds the complete combustion speed regardless of the on state of the start switch. This inhibits useless action of the starter motor.

(8) The action of the engine igniter is inhibited when the engine fails to start and its speed stays lower than the complete combustion speed, hence allowing no back kicking.

(9) As the remote controller and the transponder are connected to each other by a radio link, no remote control cord is needed. Also, as the engine generator and the transponder are communicated over the power line of the engine generator, no extra transmission cord is needed. Accordingly, the engine generator can be improved in the mobility and the maneuverability with no use of remote control cords and transponder cords.

(10) The remote control signal exchanged between the engine generator and the remote controller carries the address code for identifying the target to be communicated, hence allowing any desired one of engine generators to be selectively operated by remote control.

(11) While the engine generator receives the remote control signal and releases its reply, the remote controller dispatches the remote control signal once again when receiving no reply. As a result, the engine generator can be remote controlled at higher certainty.

(12) The remote controller upon detecting the error signal released from the engine generator displays the occurrence of the error. This allows the error of the engine generator to be readily recognized by an operator of the remote controller who is at a far location where the engine generator is out of view.

What is claimed is:

1. An engine generator comprising:
 a power generator driven by an engine;
 a starter motor for cranking the engine; and a controller for controlling various electric loads including the start motor with a driving voltage which depends on the power supplied from the generator and a battery, wherein the controller including:

an igniter for supplying at ignition coil of the engine with igniting energy; and a connection means for connecting the power supply line of the igniter with a power supply line of the generator and a power supply line of the battery which are connected in parallel with each other; and an inverter circuit for converting an output of a rectifier circuit into an alternating voltage.

2. An engine generator comprising:

a power generator driven by an engine;

a starter motor for cranking time engine; and a controller for controlling various electric loads including the start motor with a driving voltage which depends on the power supplied from the generator and a battery, an igniter for supplying an ignition coil of the engine with igniting energy; and the controller including a duty ratio controller for setting the duty ratio of the driving voltage supplied to the starter motor to a smaller level at the startup of the starter motor and then gradually increasing the same with time; and am inverter circuit for converting an output of a rectifier circuit into an alternating voltage.

3. An engine generator with a controller for supplying various electric loads including a starter motor with a driving voltage which depends on the power received from a generator and a battery, comprising:

igniter for supplying an ignition coil of the engine with igniting energy;

a connection means for connecting the power supply line of the igniter with a power supply line of the generator and a power supply line of the battery which are connected in parallel with each other;

an inverter circuit for converting an output of a rectifier circuit into an alternating voltage.

4. An engine generator with a controller for supplying various electric loads including a starter motor with a driving voltage which depends on the power received from a generator and a battery, an igniter for supplying an ignition coil of the engine with igniting energy; and the controller including a duty ratio controller for setting the duty ratio of the driving voltage supplied to the starter motor to a smaller level at the startup of the starter motor and then gradually increasing the same with time; and arm inverter circuit for converting an output of a rectifier circuit into an alternating voltage.

5. An engine generator having an alternating current generator driven by an engine, a rectifier circuit for rectifying a main output released from the output terminal of the alternating current generator, and an inverter circuit for converting an output of the rectifier circuit into an alternating voltage, comprising;

a transformer connected at its primary side to the output terminal of time alternating current generator, two or more sub-coils connected at the secondary side of the transformer, and a sub-coil connection means for connecting each sub-coil corresponding electric load.

6. An engine generator according to claim 5, wherein the sub-coil connection means includes a first connection means for connecting one of the sub-coils with a power source line of the inverter circuit.

7. An engine generator according to claim 5, wherein the sub-coil connection means includes a second connection means for connecting one of the sub-coils with a power source line for charging a battery.

8. An engine generator according to claim 5, wherein the sub-coil connection means includes a third connection means for connecting one of the sub-coils with a direct-current output line.

9. An engine generator with an engine starter apparatus for driving a starter motor to crank an engine, comprising;

a start switch for starting the engine;

an igniting means for combusting the engine at specific timing; and a controller for controlling the action of the starter motor and the igniting means on the basis of the engine speed so that the action of the starter motor is canceled when the engine speed in the cranking action exceeds a first reference and then the action of the igniting means is inhibited when the engine speed becomes lower than a second reference speed.

10. An engine generator according to claim 9, wherein the first and second reference speed are between the engine speed in the cranking action of the startermotor and the minimum engine speed in the complete combustion process of the engine.

11. An engine generator with an engine starter apparatus for driving a starter motor to crank an engine, comprising:

a start switch for starting the engine;

an igniting means for combusting the engine at specific timing; and a controller for controlling the action of the starter motor and the igniting means on the basis of the engine speed, the controller including:

an engine stop examining means for examining from the engine speed whether the engine is in action or not; and an engine start controller for switching on the starter motor and the igniting means when the start switch is turned on and the engine stop examining means judges that the engine is not in action.

12. An engine generator according to claim 11, wherein the engine stop examining means judges that the engine is not in action when a condition that the engine speed is zero continues a predetermined length of time.

13. An engine generator with a remote control system comprising:

a transponder connected to a power line of the engine generator; and a remote controller for communication with the transponder over a radio link, wherein a remote control signal is exchanged in two ways across the transponder between the engine generator and the remote controller, the engine generator and the transponder comprise a transfer means respectively for transfer of the remote control signal mutually over the power line of the engine generator.

14. An engine generator according to claim 13, wherein the remote control signal serves as a start signal for starting the engine generator, a stop signal for canceling the action of the engine generator, or a notify signal for notifying the action of the engine generator.

15. An engine generator according to claim 13, wherein the remote control signal includes an address code for identifying the other party to be communicated and a control code for controlling the other party to be communicated.

16. An engine generator according to claim 15, wherein the control code is selected from a start code for starting the engine generator, a stop code for canceling the action of the engine generator, and a notify code for notifying the action of the engine generator.

17. An engine generator according to claim 15, where in the engine generator releases a reply in response to reception of the remote control signal and the remote controller repeats the transmission of the remote control signal when receiving no reply of the remote control signal.

18. An engine generator according to claim 1, wherein the engine generator when detecting an error inside dispatches the remote control signal carrying data of the error to the remote controller which in turn displays the data of the error carried on the remote control signal.

* * * * *